United States Patent
Lee et al.

(10) Patent No.: US 12,288,980 B2
(45) Date of Patent: Apr. 29, 2025

(54) OVER-CURRENT PROTECTION DEVICE

(71) Applicant: Polytronics Technology Corp., Hsinchu (TW)

(72) Inventors: Yi-Hsuan Lee, Taichung (TW); Pin Hsuan Li, Hsinchu (TW); Yi-An Sha, Xindian (TW)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 203 days.

(21) Appl. No.: 17/965,301

(22) Filed: Oct. 13, 2022

(65) Prior Publication Data

US 2023/0361559 A1 Nov. 9, 2023

(30) Foreign Application Priority Data

May 6, 2022 (TW) .................................. 111117175

(51) Int. Cl.
*H02H 9/02* (2006.01)
*H01C 7/02* (2006.01)

(52) U.S. Cl.
CPC ............. *H02H 9/026* (2013.01); *H01C 7/027* (2013.01)

(58) Field of Classification Search
CPC ...... H02H 9/026; H01C 7/027; H01C 1/1406; H01C 7/02; H01C 7/021; H01C 1/02; Y02E 60/10
USPC .......................................................... 361/106
See application file for complete search history.

(56) References Cited

U.S. PATENT DOCUMENTS

| 2014/0285938 A1* | 9/2014 | Tseng ..................... H01C 7/021 |
| | | 361/93.8 |
| 2016/0105965 A1* | 4/2016 | Sepulveda ............... H01C 7/02 |
| | | 174/258 |
| 2023/0245802 A1* | 8/2023 | Fang ..................... H01C 7/028 |
| | | 338/20 |

OTHER PUBLICATIONS

Datasheet2 (Panasonic Aluminum electrolytic capacitors, radial lead type, Mar. 4, 2016) (Year: 2016).*
Datasheet (Aluminum electrolytic capacitor, Aug. 4, 2020) (Year: 2020).*
Aluminum electrolytic capacitor, Aug. 4, 2020 (Year: 2020).*
Panasonic Aluminum electrolytic capacitors, radial lead type, Mar. 4, 2016 (Year: 2016).*

(Continued)

*Primary Examiner* — Scott Bauer
*Assistant Examiner* — Sreeya Sreevatsa
(74) *Attorney, Agent, or Firm* — Muncy, Geissler, Olds & Lowe, P.C.

(57) ABSTRACT

An over-current protection device includes a resistor element, an outer electrode, and an encapsulation layer. The resistor element has a first insulation layer, a first electrically conductive layer, a PTC material layer, a second electrically conductive layer and a second insulation layer stacked sequentially from bottom to top. The first insulation layer has a bottom surface and a first sidewall adjoining the bottom surface. The outer electrode has a first electrode and a second electrode disposed on the bottom surface. The first and second electrodes are electrically connected to the first conductive layer through the first and second vias, respectively. The encapsulation layer covers the first sidewall of the first insulation layer and extends to a part of the bottom surface, thereby forming a first perimeter on the bottom surface of the first insulation layer. The first and second electrodes are located inside the first perimeter.

16 Claims, 10 Drawing Sheets

(56) References Cited

OTHER PUBLICATIONS

Y. Yao, G.-Q. Lu, D. Boroyevich and K. D. T. Ngo, "Survey of High-Temperature Polymeric Encapsulants for Power Electronics Packaging," in IEEE Transactions on Components, Packaging and Manufacturing Technology, vol. 5, No. 2, pp. 168-181, Feb. 2015, doi: 10.1109/TCPMT.2014.2337300 (Year: 2015).*

* cited by examiner

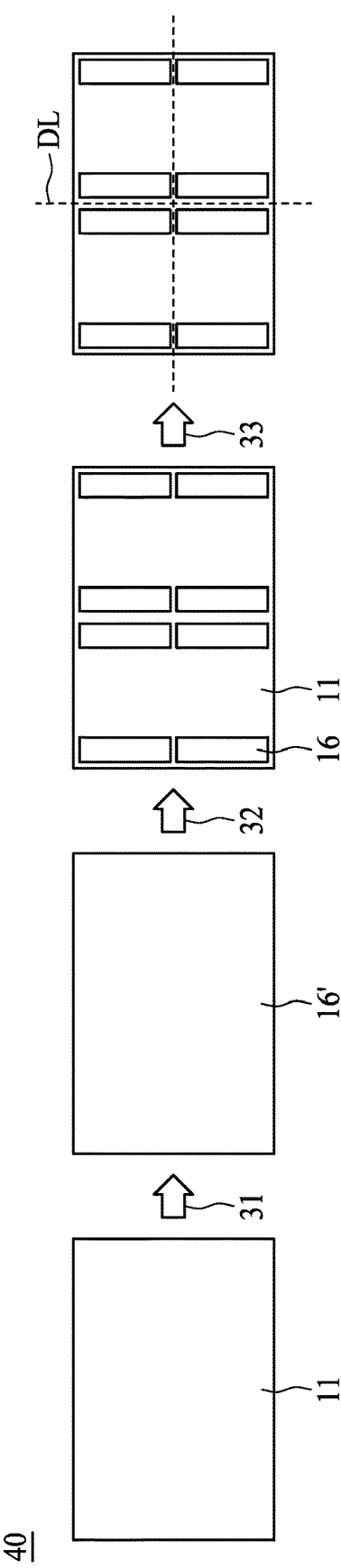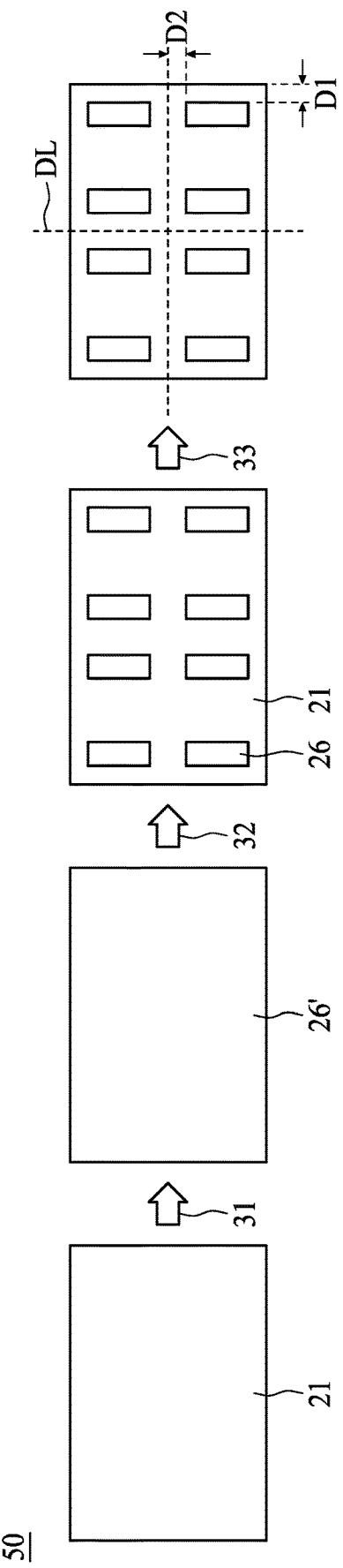
FIG. 4a
FIG. 4b

OVER-CURRENT PROTECTION DEVICE

BACKGROUND OF THE INVENTION

(1) Field of the Invention

The present application relates to an over-current protection device, and more specifically, to an over-current protection device having an encapsulation layer.

(2) Description of the Related Art

Because the electrical resistance of conductive composite materials having a positive temperature coefficient (PTC) characteristic is very sensitive to temperature variation, it can be used as the material for current sensing devices and has been widely applied to over-current protection devices or circuit devices. More specifically, the electrical resistance of the PTC conductive composite material remains extremely low at normal temperatures, so that the circuit or cell can operate normally. However, when an over-current or an over-temperature event occurs in the circuit or cell, the electrical resistance will instantaneously increase to a high electrical resistance state (e.g., at least above $10^4$ Ω), which is the so-called "trip." Therefore, the over-current will be eliminated so as to protect the cell or the circuit device.

However, electronic apparatuses have a trend being made with a more miniaturized size than before as time goes on, and thus over-current protection devices, especially the PTC layers therein, would be easily influenced by outer matters in external environment (e.g., moisture, oxygen, dust, temperature, etc.), thereby causing issues such as performance degradation, high electrical resistance before trip, or the like. Conventionally, the device may be packaged with an insulation layer on its exterior, but the structural design has some defects.

Please refer to FIGS. 1a and 1b, which show cross-sectional views of two conventional over-current protection devices 10 and 20 with similar structure. Both of them include outer electrodes 16, first insulation layers 11, first electrically conductive layers 12, PTC material layers 13, second electrically conductive layers 14 and second insulation layers 15 stacked sequentially from bottom to top. The outer electrode 16 has a first electrode 16a on a right side, and a second electrode 16b on a left side. The first insulation layer 11 has two through-holes to form a first via 17a and a second via 17b, by which the first electrode 16a is connected to the first electrically conductive layer 12 through the first via 17a, and the second electrode 16b is connected to the first electrically conductive layer 12 through the second via 17b. The first electrically conductive layer 12 connected with the first electrode 16a is not electrically connected to the first electrically conductive layer 12 connected with the second electrode 16b.

In the process of manufacturing the over-current protection devices 10 and 20, layers having aforementioned components are laminated to form a plate structure first. Next, the plate structure undergoes drilling, electroplating and patterning processes, and the processed plate structure can be diced to form a plurality of the over-current protection devices 10 and 20. During the dicing process, because the dicing tolerance is very tight, this may make it possible that the first electrode 16a and/or the second electrode 16b are spaced apart from the edge by an extremely short distance D (as shown in FIG. 1a) if the cutter is not aligned with the dicing line accurately; or in other case, the dicing step would make the edges be perfectly flush with the electrodes 16a and 16b (as shown in FIG. 1b) if the cutter is aligned with the dicing line accurately. However, neither the over-current protection device 10 nor the over-current protection device 20 in FIGS. 1a-1b has the insulation material packaged on the bottom surface of the first insulation layer 11. The conventional over-current protection devices 10 and 20 are merely packaged with the insulation material on their sidewalls (e.g., an insulation layer on sidewalls of the device, or an insulation frame on sidewalls of the device). The insulation material formed on the sidewalls are used to solve the above-said issues, i.e., performance degradation or high electrical resistance before trip, in the device, especially in the PTC layer. Nevertheless, there are still issues arising from the conventional design, which are detailed below.

Regarding the conventional structure of the device in FIG. 1a, the distance D, due to tight dicing tolerance, may be formed after dicing step as described above, and this makes it that the interval D between the edge and the first electrode 16a (or the second electrode 16b) is narrow. When the device is packaged thereafter with an insulation layer on its sidewalk, it is inevitable that the bottom surface of the first insulation layer 11 as well as sides of the first electrode 16a or the second electrode 16b are coated with such insulation material, too. It may decrease the outside surface area of the outer electrode 16 for welding, and further affect weldability of the outer electrode 16 to circuit boards, thereby influencing electrical characteristics of the device. In addition, the distance D is so small that the device could not have a sufficient space for accommodating the insulation material. The cured insulation material in contact with the first electrode 16a and the second electrode 16b would be uneven on sides of the first electrode 16a and the second electrode 16b. Undoubtedly, the height of the insulation material may exceed the height of the outer electrode 16, and the device would have an asymmetrical structure with higher left side/lower right side or lower left side/higher right side. Even though the amount of the insulation material may be minimized as much as possible in order to avoid contacting sidewall or covering downside of the outer electrode 16, the bottom surface area of the first insulation layer 11 for packaging is still quite limited if coating step is applied to a miniaturized over-current protection device.

Regarding the conventional structure of the device in FIG. 1b, the cut line is perfect during the dicing process, and thus there is no distance D. When the packaging process is performed on the sidewalk, it is observed that not only the sidewalls of the first electrode 16a and the second electrode 16b but also the bottoms of that will inevitably be coated with the insulation material due to excessive amount of it, and therefore the welding quality of the electrodes decreases. More specifically, the insulation material is flowable at the beginning of the packaging process, and then it can be cured after coating at the desired location. During the packaging process, one would make efforts to prevent the insulation material from contacting the surface (i.e., the outside surface of the first electrode 16a and the second electrode 16b) to be welded. For example, sidewalls of the first electrically conductive layer 12, the PIC material layer 13, and the second electrically conductive layer 14 are exposed to external environment after lamination, and together forms a peripheral sidewall. One would only coat the peripheral sidewall with the insulation material. However, in fact, it is difficult to precisely control the coating position and the thickness of the insulation material, and therefore the insulation material flows to contact the sidewalls of the first electrode 16a and the second electrode 16b even though great effort could be made. Moreover, the insulation material may further flow to the bottoms of the first electrode 16a and the second electrode 16b from their sidewalls if the coating amount is excessive as described above. After the insulation material is cured, the bottoms of the first electrode 16a and the second electrode 16b are always uneven, that is, the coated bottom of the first electrode 16a is not flush with the coated bottom of the second electrode 16b, and it may cause welding deviation and/or other welding defects. The same problem exists in the conventional device as shown in FIG. 1a.

Accordingly, there is a need to prevent the outer electrode from being covered so that the outside surface area of the outer electrode may have sufficient welding area, and to improve the welding quality of the over-current protection devices 10 and 20, as shown in FIGS. 1a and 1b.

SUMMARY OF THE INVENTION

The present invention provides an over-current protection device with an extended distance from its edge to the component to be welded (i.e., the outer electrode). The extended distance provides space available for coating of an encapsulation layer. In this way, the encapsulation layer can be coated on the surface where the outer electrode is placed, and the encapsulation layer is spaced apart from the outer electrode. That is, the outer electrode and the encapsulation layer are disposed on the same surface without contacting each other. In other case, the present invention provides the extended distance while elevating the height of the outer electrode, and the encapsulation layer may be coated on a sidewall of the outer electrode. Compared with the conventional packaging structure, the aforementioned extended distance may prevent the outer electrode from being coated with the encapsulation layer, or prevent the bottom of the outer electrode from being coated even with the excessive encapsulation layer. Besides, the extended distance may enhance the process tolerance, and therefore the over-current protection device can tolerate the excessive encapsulation layer in a certain range without decreasing the welding quality. Moreover, the present invention finds that the electrical resistance fluctuation can be significantly reduced when adopting the above design with the encapsulation layer on the insulation layer.

In accordance with an aspect of the present invention, an over-current protection device includes a resistor element, an outer electrode, and an encapsulation layer. The resistor element has a first insulation layer, a first electrically conductive layer, a positive temperature coefficient (PTC) material layer, a second electrically conductive layer and a second insulation layer stacked sequentially from bottom to top, wherein the first insulation layer has a bottom surface and a first sidewall connected to the bottom surface, and the bottom surface has a first via and a second via penetrated therethrough. The outer electrode has a first electrode and a second electrode disposed on the bottom surface. The first electrode and the second electrode are electrically connected to the first electrically conductive layer through the first via and the second via, respectively. The first electrode is electrically isolated from the second electrode. The encapsulation layer covers the first sidewall and extends to a part of the bottom surface of the first insulation layer, thereby forming a first perimeter on the bottom surface of the first insulation layer, and the first and second electrodes are located inside the first perimeter.

In an embodiment, after stacking, an exposed portion of the first electrically conductive layer, an exposed portion of the PTC material layer, and an exposed portion of the second electrically conductive layer together form a peripheral sidewall. The encapsulation layer covers the peripheral sidewall.

In an embodiment, the second insulation layer has an upper surface opposite to the bottom surface and a second sidewall connected to the upper surface. The encapsulation layer further covers the second sidewall and extends to a part of the upper surface, thereby forming a second perimeter on the upper surface of the second insulation layer, and the resistor element only exposes a center portion of the upper surface and a center portion of the bottom surface to external environment.

In an embodiment, the encapsulation layer covers the part of the bottom surface of the first insulation layer and is not physically in contact with the first electrode and the second electrode.

In an embodiment, the first electrode is spaced apart from a side of the bottom surface of the first insulation layer by a distance ranging from 2 mil to 9 mil.

In an embodiment, the encapsulation layer has a thickness ranging from 0.04 mm to 0.08 mm.

In an embodiment, the bottom surface of the first insulation layer has a long side and a short side, the first electrode is spaced apart from the short side by a first distance, and the first electrode is spaced apart from the long side by a second distance. If the total length of the long side is calculated as 100%, the first distance ranges from 5% to 16% compared to the long side. If the total length of the short side is calculated as 100%, the second distance ranges from 9% to 27% compared to the short side.

In an embodiment, the long side ranges from 40 mil to 50 mil, and the short side ranges from 20 mil to 30 mil. If the total length of the long side is calculated as 100%, the first distance ranges from 5.74% to 15.12% compared to the long side. If the total length of the short side is calculated as 100%, the second distance ranges from 10.48% to 27.61% compared to the short side.

In an embodiment, the long side ranges from 60 mil to 70 mil, and the short side ranges from 30 mil to 40 mil. If the total length of the long side is calculated as 100%, the first distance ranges from 4.94% to 12.31% compared to the long side. If the total length of the short side is calculated as 100%, the second distance ranges from 9.46% to 23.57% compared to the short side.

In an embodiment, the first electrode has a width extending along the long side, and a height extending away from the first insulation layer. The width ranges from 0.1 mm to 0.5 mm, and the height ranges from 12 μm to 120 μm.

In an embodiment, the encapsulation layer covers the part of the bottom surface of the first insulation layer and is physically in contact with a sidewall of the first electrode. The first electrode has the height ranging from 50 μm to 120 μm.

In an embodiment, the second electrode is spaced apart from a side of the bottom surface of the first insulation layer by a distance ranging from 2 mil to 9 mil.

In an embodiment, the first electrode and the second electrode are spaced apart from each other by a third distance along the long side, and the third distance is larger than 0.23 mm.

In an embodiment, the encapsulation layer comprises a material selected from the group consisting of epoxy resin, polyester resin, polyamide resin, phenolic resin, epoxy resin with glass fiber or inorganic filler, phenolic resin with glass fiber or inorganic filler, polyurethane resin, polycyanate resin, maleimide resin, polyolefin resin, polyphenylene oxide resin, silicone polymer, acrylic resin, photopolymer resin, inorganic glue, and combinations thereof.

In accordance with an aspect of the present invention, the over-current protection device includes a resistor element, an outer electrode, and an encapsulation layer. The resistor element has a first insulation layer, a first electrically conductive layer, a positive temperature coefficient (PTC) material layer, a second electrically conductive layer, and a second insulation layer stacked sequentially from bottom to top. The resistor element further has a left notch and a right notch at opposite left and right ends of the resistor element. The first insulation layer has a bottom surface and a first sidewall connected to the bottom surface. The second insulation layer has an upper surface and a second sidewall connected to the upper surface. The left notch is disposed at the left end of the resistor element, and extends from the bottom surface to the upper surface. The right notch is disposed at the right end of the resistor element, and extends from the bottom surface to the upper surface. The outer electrode has a first electrode and a second electrode. The first electrode is electrically connected to the second electrically conductive layer, and disposed on the upper surface and the bottom surface at the right end. The second electrode is electrically connected to the first electrically conductive layer, and disposed on the upper surface and the bottom surface at the left end. The first electrode is electrically isolated from the second electrode. The encapsulation layer covers the first sidewall and extends to a part of the bottom surface of the first insulation layer, thereby forming a perimeter discontinuously extending on the bottom surface of the first insulation layer. The first and second electrodes are located inside a region encircled by the perimeter discontinuously extending on the bottom surface.

In an embodiment, after stacking, an exposed portion of the first electrically conductive layer, an exposed portion of the PTC material layer, and an exposed portion of the second electrically conductive layer together form a peripheral sidewall. The encapsulation layer covers the peripheral sidewall.

In an embodiment, the encapsulation layer further covers the second sidewall and extends to a part of the upper surface, thereby forming a perimeter discontinuously extending on the upper surface of the second insulation layer. The first and second electrodes are located inside a region encircled by the perimeter discontinuously extending on the upper surface, by which the resistor element only and partially exposes the upper surface and the bottom surface to external environment.

In an embodiment, the over-current protection device further includes a left conductive member disposed in the left notch, and a right conductive member disposed in the right notch. The first electrode is electrically connected to the second electrically conductive layer through the right conductive member and is electrically isolated from the first electrically conductive layer. The second electrode is electrically connected to the first electrically conductive layer through the left conductive member and is electrically isolated from the second electrically conductive layer.

In an embodiment, the bottom surface of the first insulation layer has two long sides and two short sides connected to the long sides. The perimeter continuously extends along the long sides to the short sides, and then discontinuously extends along the short sides to the left conductive member and the right conductive member, respectively, by which the left conductive member and the right conductive member are not fully covered by the encapsulation layer.

In an embodiment, the first electrode is spaced apart from a side of the bottom surface of the first insulation layer by a distance ranging from 2 mil to 9 mil.

In an embodiment, the encapsulation layer comprises a material selected from the group consisting of epoxy resin, polyester resin, polyamide resin, phenolic resin, epoxy resin with glass fiber or inorganic filler, phenolic resin with glass fiber or inorganic filler, polyurethane resin, polycyanate resin, maleimide resin, polyolefin resin, polyphenylene oxide resin, silicone polymer, acrylic resin, photopolymer resin, inorganic glue, and combinations thereof.

BRIEF DESCRIPTION OF THE DRAWINGS

The present application will be described according to the appended drawings in which:

FIG. 2b shows a cross-sectional view of the over-current protection device along the dashed line AA in FIG. 2a;

FIG. 2c shows a bottom view of the over-current protection device shown in FIG. 2a;

FIG. 4a shows a process flow of manufacturing the over-current protection device in accordance with prior art;

FIG. 4b shows a process flow of manufacturing the over-current protection device in accordance with the present invention;

FIG. 6b shows a cross-sectional view of the over-current protection device along the dashed line BB in FIG. 6a;

FIG. 6c shows a cross-sectional view of the over-current protection device along the dashed line CC in FIG. 6a;

FIG. 6e shows an enlarged sectional view of the over-current protection device shown in FIG. 6a.

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

The present invention may apply to surface-mountable devices (SMD), especially surface-mountable over-current protection devices (i.e., SMD over-current protection devices). The devices are packaged by an encapsulation layer and isolated from external environment, thereby preventing the devices from being influenced by external environment, and in the meantime, solving the issues such as performance degradation or high electrical resistance before trip. Moreover, the encapsulation layer would not contact an outer electrode of the device and hence the welding quality of the device to the substrate (e.g., the circuit board) is improved. In the following, two aspects of SIM over-current protection devices of the present invention are exemplified in FIGS. 2a-5c and FIGS. 6a-6e, respectively, and details thereof are disclosed.

Figure 2A:
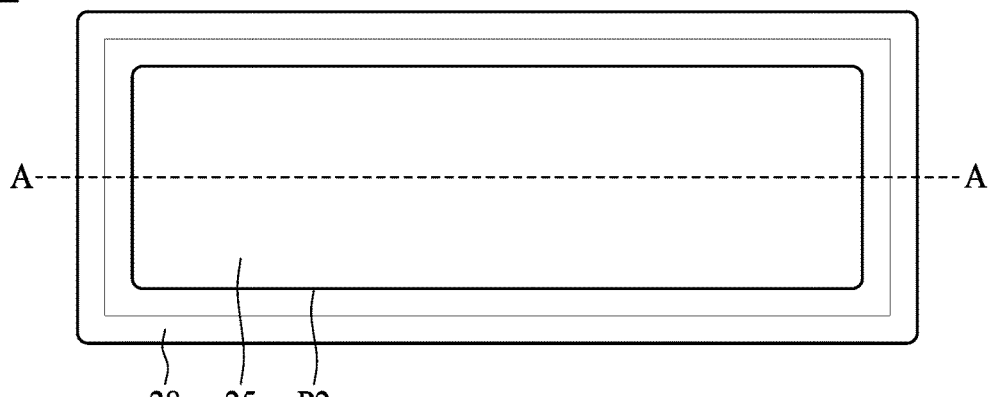
FIG. 2a shows a top view of an over-current protection device in accordance with a first aspect of the present invention.
Figure 2B:
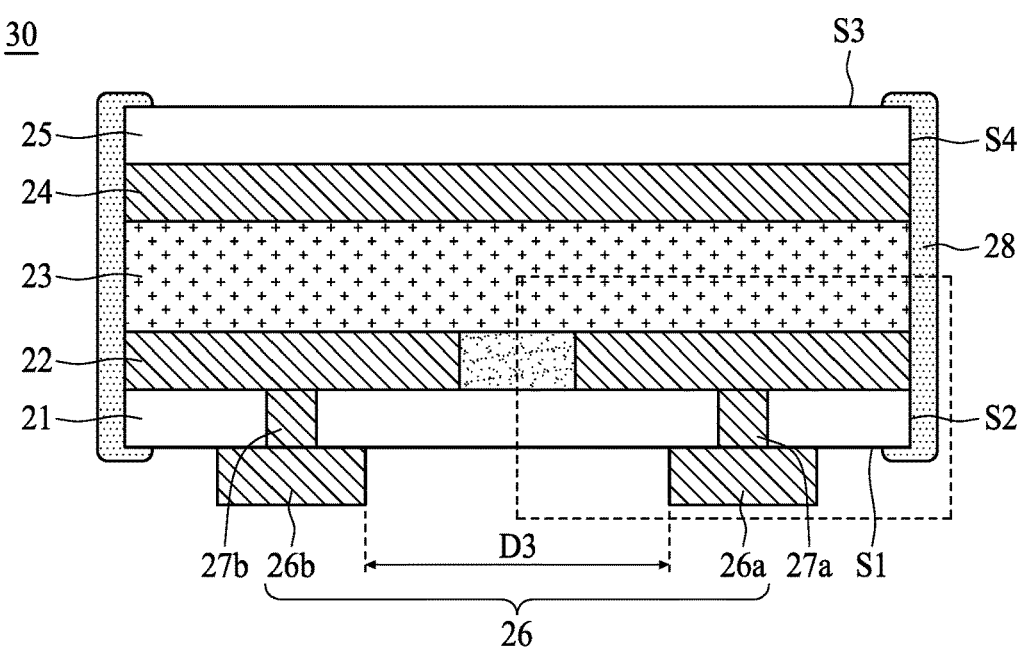
Figure 2C:
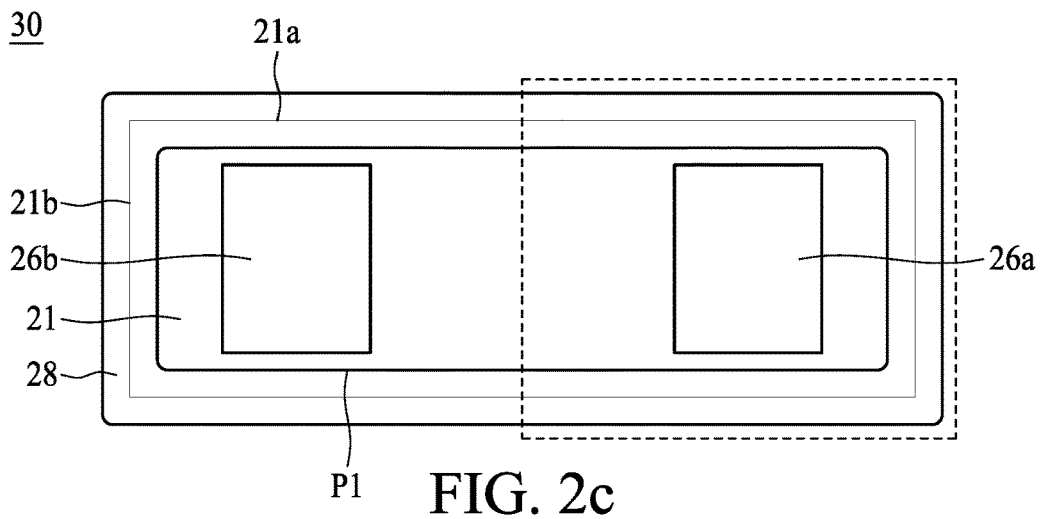

Please refer to FIGS. 2a-2c. FIGS. 2a-2c show a first aspect of an over-current protection device 30 of the present invention. FIG. 2a and FIG. 2c show the top view and bottom view of the over-current protection device 30, respectively, in which FIG. 2b is the cross-sectional view of the over-current protection device along the dashed line AA in FIG. 2a. In this first aspect of the present invention, the over-current protection device 30 includes a resistor element, an outer electrode 26, and an encapsulation layer 28. Details are described below.

In FIG. 2b, the resistor element has a first insulation layer 21, a first electrically conductive layer 22, a positive temperature coefficient (PTC) material layer 23, a second electrically conductive layer 24 and a second insulation layer 25 stacked sequentially from bottom to top. The first insulation layer 21 has a bottom surface S1 and a first sidewall S2 connected to the bottom surface S1, and the bottom surface S1 has a first via 27a and a second via 27b penetrated therethrough. The second insulation layer 25 has an upper surface S3 opposite to the bottom surface S1 and a second sidewall S4 connected to the upper surface S3. The appearance of the resistor element substantially shows a hexahedral structure with top/bottom surfaces and four side surfaces between the top/bottom surfaces. The top surface of the resistor element is the upper surface S3 of the second insulation layer 25, and the bottom surface of the resistor element is the bottom surface S1 of the first insulation layer 21. After stacking, the first electrically conductive layer 22, the PTC material layer 23, and the second electrically conductive layer 24 are laminated between the first insulation layer 21 and the second insulation layer 25 with only four sides exposed and to be covered by the encapsulation layer 28. Such four sides form a peripheral sidewall. The peripheral wall, the first sidewall S2 of the first insulation layer 21, and the second sidewall S4 of the second insulation layer 25 together form the four side surfaces of the resistor element. In an embodiment, the PTC material layer 23 may consist of polymeric positive temperature coefficient (PPTC) material, including a crystalline polymer and a conductive filler dispersed in the crystalline polymer. In an embodiment, the crystalline polymer may be polyethylene, polypropylene, polyvinyl fluoride, mixture, or copolymer thereof. The conductive filler may be carbon-containing filler, metal filler, metal carbide filler, metal boride filler, metal nitride filler, or combinations thereof. Besides, the first insulation layer 21 and the second insulation layer 25 may be made of thermoset prepreg that would be cured at high temperature.

The outer electrode 26 has a first electrode 26a and a second electrode 26b. The first electrode 26a and the second electrode 26b are disposed on the bottom surface S1 of the first insulation layer 21. The first electrode 26a and the second electrode 26b are electrically connected to the first electrically conductive layer 22 through the first via 27a and the second via 27b, respectively. The first electrically conductive layer 22 consists of at least two parts spaced apart from each other, and thus the first electrode 26a and the second electrode 26b are electrically isolated from each other and electrically connected to the two parts of the first electrically conductive layer 22 through the first via 27a and the second via 27b, respectively. Accordingly, the first electrode 26a, the first via 27a, one part of the first electrically conductive layer 22 corresponding to the first electrode 26a, the PTC material layer 23, the second electrically conductive layer 24, the PTC material layer 23, the other part of the first electrically conductive layer 22 corresponding to the second electrode 26b, the second via 27b, and the second electrode 26b of the over-current protection device 30 sequentially form a conductive path allowing current passing therethrough. The conductive path goes through the PTC material layer 23 twice and forms a circuit equivalent to two resistors connected in series.

The encapsulation layer 28 covers the first sidewall S2 and extends to a part of the bottom surface S1 of the first insulation layer 21, thereby forming a first perimeter P1 on the bottom surface S1 of the first insulation layer 21, and the first and second electrodes 26a/26b are located inside the first perimeter P1 (as shown in FIG. 2c). The encapsulation layer 28 may further cover the second sidewall S4 and extend to a part of the upper surface S3 of the second insulation layer 25, thereby forming a second perimeter P2 on the upper surface S3 of the second insulation layer 25 (as shown in FIG. 2a).

In the first aspect of the present invention, the encapsulation layer 28, either viewed from top or bottom, substantially has a shape of a hollow square with an inner perimeter and an outer perimeter encircled by two continuous lines. The inner perimeter is the first perimeter P1 in bottom view (FIG. 2c) or second perimeter P2 in top view (FIG. 2a). In addition, the over-current protection device 30 only exposes center portion of the bottom surface S1, first electrode 26a, second electrode 26b, and center portion of the upper surface S3 to the external environment after packaging by the encapsulation layer 28. In FIG. 2b, the encapsulation layer 28 appears to have a shape constituted by two opposite "⊓" with two openings thereof facing each other. Owing to such design, the encapsulation layer 28 can further extend to the upper surface S3 and the bottom surface S1, thereby clamping the resistor element from both top and bottom. In this way, compared to conventional design as described in "Description of the Related Art", structural strength of the over-current protection device 30 may be further enhanced (e.g., less deformation under high temperature or during the operation of the device which trips lots of times), and the encapsulation layer 28 can be firmly fixed on the device in the meantime. If the encapsulation layer 28 only covers the first sidewall S2 and the second sidewall S4 and do not extend to the bottom surface S1 and the upper surface S3, the bottom surface and top surface of the encapsulation layer 28 are coplanar with the bottom surface S1 and the upper surface S3. Owing to the coplanar design, the encapsulation layer 28 cannot employ a clamping force that advantageously prevents the device from severe deformation, and the encapsulation layer 28 is easily detached from interfaces on the first sidewall S2 or the second sidewall S4 under high temperature at which the device 30 trips or undergoes over-current event. Also, if the encapsulation layer 28 do not extends from the first sidewall S2 and the second sidewall S4 further to the bottom surface S1 and the upper surface S3 around corners of the device 30, the interface between the first sidewall S2 (or the second sidewall S4) and the encapsulation layer 28 goes straight up and down to the external environment. Thus, the interface is directly exposed to the external environment, resulting in that moisture, dust, organic solvents, or other environmental factors may easily enter the interface, and the electrical characteristics of the device are easily affected. On the contrary, if the encapsulation layer 28 conformally extends from the first sidewall S2 and the second sidewall S4 to the bottom surface S1 and the upper surface S3, structures with angle of almost 90° between extending portion and vertical portion of the encapsulation layer 28 are formed around the corners of the first insulation layer 21 and the second insulation layer 25. In this way, the interfaces between the first sidewall S2 (or the second sidewall S4) and the encapsulation layer 28 are not easily accessible to the environmental factors, and the over-current protection device 30 can have a more stable electrical resistance. The electrical resistance would not fluctuate and jump to a high level under normal condition. For this purpose, in some embodiments, the encapsulation layer 28 forms a bending structure with angle of almost 90° between extending portion and vertical portion of the encapsulation layer 28 at the corner linking the bottom surface S1 and the first sidewall S2, and/or at the corner linking the upper surface S3 and the second sidewall S4. That is, in cross-sectional view, the encapsulation layer 28 may form a structure having the shape of two opposite "⊓" in an embodiment or two opposite "L" in another embodiment, both making the over-current protection device 30 have a stable electrical resistance. The electrical resistance would not fluctuate and jump to a high level under normal condition. In practice, the bending structure may have other shapes as long as the encapsulation layer 28 can clamp the resistor element. For example, the bending structure may have an arcuate shape to wrap around the corner (as shown in FIG. 3c) linking the bottom surface S1 and the first sidewall S2, and/or the corner linking the upper surface S3 and the second sidewall S4, thus clamping the resistor element. Alternatively, there are a plurality of turning points at the corner (as shown in FIG. 3d) linking the bottom surface S1 and the first sidewall S2, and/or at the corner linking the upper surface S3 and the second sidewall S4, such that the encapsulation layer 28 conformally formed around the corners can clamp the resistor element. Certainly, in addition to claiming the resistor element from both top and bottom thereof, the encapsulation layer 28 may merely clamp the resistor element from either top or bottom, and such clamping could also partly prevent outer matters in the external environment from entering the interface.

It is noted that in FIG. 2a and FIG. 2c, the encapsulation layer 28 is illustrated with transparency in order to show the outermost edge of the second insulation layer 25 and the edge of the first insulation layer 21 (e.g., a long side 21a and a short side 21b). It is understood that the encapsulation layer 28 has a specific thickness, and covers the second insulation layer 25 and the first insulation layer 21. Therefore, it can be seen that the center portions of the second insulation layer 25 and the first insulation layer 21 are exposed in the top view (FIG. 2a) and bottom view (FIG. 2c). The center portions are defined as the regions exposed and encircled by the encapsulation layer 28 on the insulation layers 25 and 21. The encapsulation layer 28 may be transparent or not, depending on the desired requirements. In an embodiment, the encapsulation layer 28 comprises a material selected from the group consisting of epoxy resin, polyester resin, polyamide resin, phenolic resin, epoxy resin with glass fiber or inorganic filler, phenolic resin with glass fiber or inorganic filler, polyurethane resin, polycyanate resin, maleimide resin, polyolefin resin, polyphenylene oxide resin, silicone polymer, acrylic resin, photopolymer resin, inorganic glue, and combinations thereof. In another embodiment, the epoxy resin may be bisphenol A-type epoxy resin, or bisphenol F-type epoxy resin.

Figure 3A:
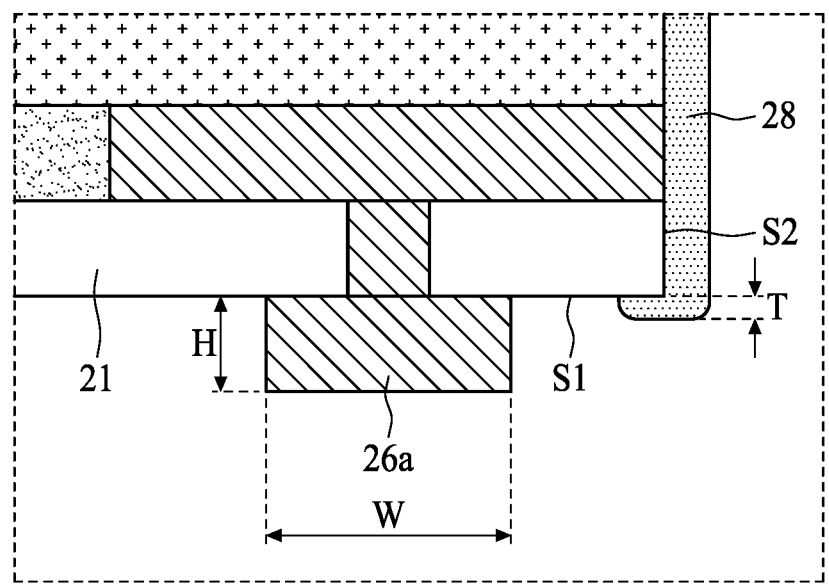
FIG. 3a shows an enlarged sectional view of the over-current protection device shown in FIG. 2b.

Please refer to FIG. 3a, which shows an enlarged sectional view of the over-current protection device 30 shown in FIG. 2b. FIG. 3a clearly shows the bottom surface S1 and the first sidewall S2 of the first insulation layer 21, and the encapsulation layer 28 is a layer having a thickness T. More specifically, the encapsulation layer 28 extends from the peripheral wall of the resistor element to the first sidewall 52, then wraps around the corner, and covers and contact part of the bottom surface S1 without attaching to the first electrode 26a. The thickness T of the encapsulation layer 28 shall not be too thin or thick. In an embodiment, the thickness T of the encapsulation layer 28 ranges from 0.04 mm to 0.08 mm. If the thickness T of the encapsulation layer 28 is lower than 0.04 mm, the encapsulation layer 28 may be too thin and rupture, or may not give the structure of device a sufficient structural strength, Specifically, because the encapsulation layer 28 is flowable before it is cured, encapsulation layer 28 with too thin thickness may have recesses in some regions after it is cured, and the recessed regions may form holes and expose the layer underneath. On the other hand, if the thickness T of the encapsulation layer 28 is higher than 0.08 mm, it is difficult to control its flow-ability and the encapsulation layer 28 would be more likely to flow to and contact the outer electrode 26, or further cover over the outer electrode 26, by which the welding quality is reduced.

Figure 3B:
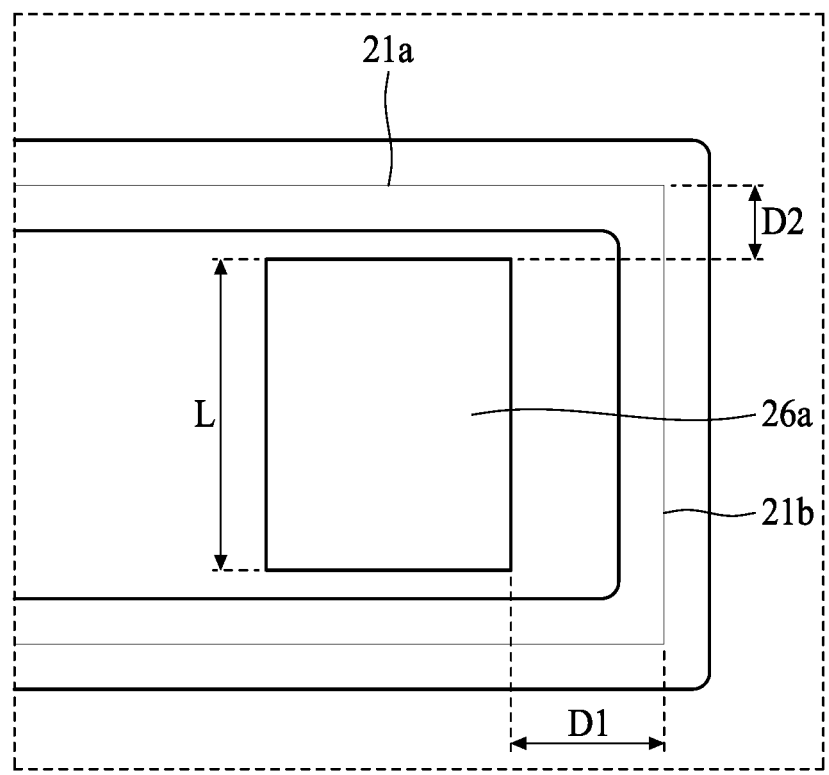
FIG. 3b shows an enlarged sectional view of the over-current protection device shown in FIG. 2c.
Figure 3C:
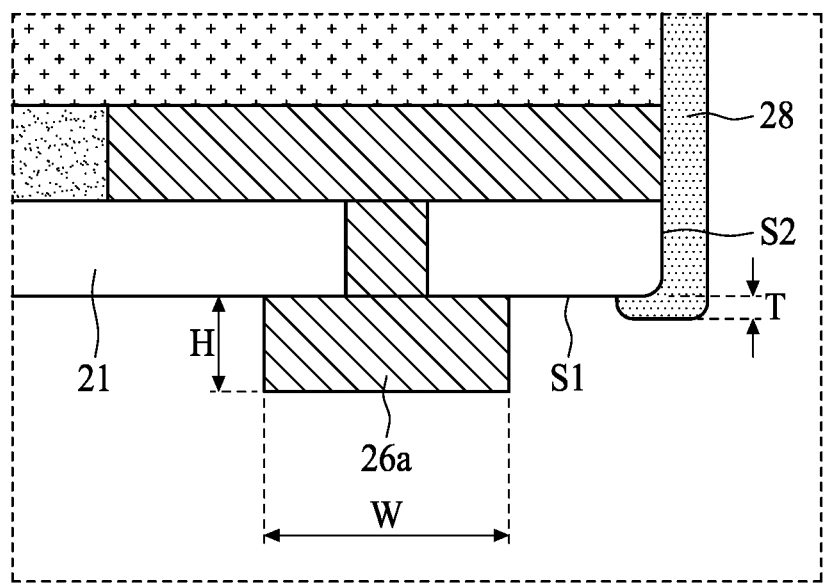
FIG. 3c shows an enlarged sectional view of the over-current protection device shown in FIG. 2b in accordance with an alternative embodiment.
Figure 3D:
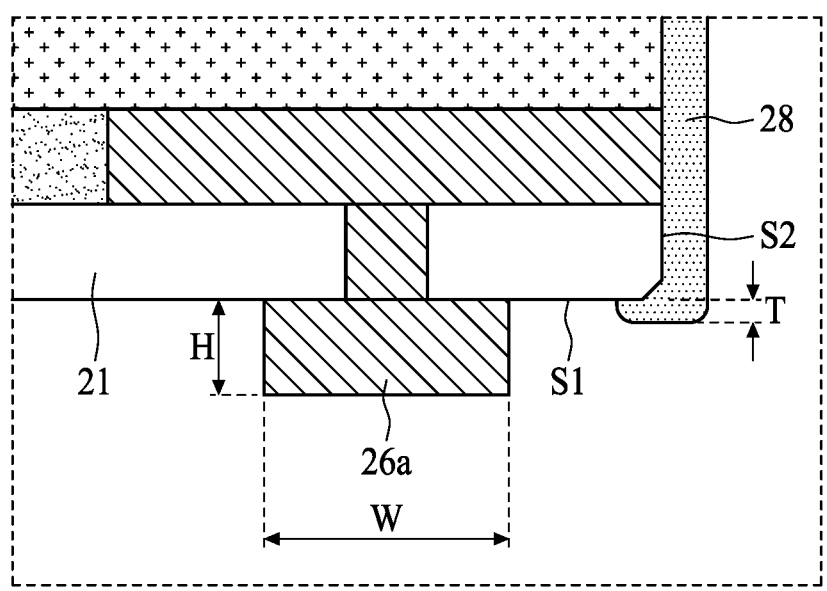
FIG. 3d shows an enlarged sectional view of the over-current protection device shown in FIG. 2b in accordance with an alternative embodiment.

Please refer to FIG. 3b, which shows an enlarged sectional view of the over-current protection device shown in FIG. 2c. The bottom surface S1 of the first insulation layer 21 has the long side 21a and the short side 21b, the first electrode 26a is spaced apart from the short side 21b by a first distance D1, and the first electrode 26a is spaced apart from the long side 21a by a second distance D2. The present invention disposes the outer electrode 26 away from the edge (i.e., the long side 21a and the short side 21b) of the first insulation layer 21, by which the bottom surface S1 of the first insulation layer 21 may have more space to accommodate the encapsulation layer 28, and the encapsulation layer 28 would not attach to the outer electrode 26 or only attach to a sidewall of the outer electrode 26 without exceeding beyond a bottom thereof.

According to the present invention, the first electrode 26a is spaced apart from the edge of the bottom surface S1 of the first insulation layer 21 by a distance ranging from 2 mil to 9 mil. That is, the first distance D1 and the second distance D2 are set to have values ranging from 2 mil to 9 mil. Within the specific range, it is observed that, because of the clamping effect as said above, the electrical resistance fluctuation can be significantly reduced, and the welding quality of the over-current protection device can be improved in the meantime as in the following experiments. The first distance D1 and the second distance D2 may arise some issues when being set too large or small. For example, when the first distance D1 or the second distance D2 is lower than 2 mil, the encapsulation layer 28 would attach to the outer electrode 26 during coating, thereby reducing the welding area and quality. Besides, the space available on the bottom surface S1 is too narrow, making the area to be covered by the encapsulation layer 28 be limited. In addition, the device would be more accessible to the environmental factors as described above, and it is also sensitive to the temperature. When the first distance D1 is higher than 9 mil, the first electrode 26a and the second electrode 26b will be much closer to each other in order to maintain the width W of the outer electrode 26 for welding to circuit board. In other words, a third distance D3 (as shown in FIG. 2b) between the first electrode 26a and the second electrode 26b would be much shorter as the first distance D1 is higher than 9 mil, increasing the probability of occurrence of electric arcing. In addition, the third distance D3 must be larger than the thickness of the PTC material layer 23 to prevent the electric arc from occurring, and the third distance D3 may be 0.23 mm in an embodiment. In an embodiment, the first distance D1 or the second distance D2 may be 2.41 mil to 6.35 mil, 3.31 mil to 8.25 mil, 2.88 mil to 5.40 mil, or 3.87 mil to 6.41 mil. In another embodiment, the first distance D1 or the second distance D2 may be 3.26 mil to 5.45 mil, 5.58 mil to 7.30 mil, 3.15 mil to 4.40 mil, or 4.32 mil to 6.10 mil. To further ensure continuity of the coated encapsulation layer and enhance the entire structural strength of the device, the first distance D1 or the second distance D2 may have larger values, such as 5.45 mil to 6.35 mil, 7.30 mil to 8.25 mil, 4.40 mil to 5.40 mil, or 6.10 mil to 6.41 mil.

In addition to the foregoing, proportion of the first distance D1 to the second distance D2 may also be adjusted as an alternative way in the present invention to obtain the above-mentioned beneficial effects. If the total length of the long side 21a is calculated as 100%, the first distance D1 ranges from 5% to 16% compared to the long side 21a. If the total length of the short side 21b is calculated as 100%, the second distance D2 ranges from 9% to 27% compared to the short side 21b. That is, the first distance D1 divided by the total length of the long side 21a is equal to 5% to 16%, and the second distance D2 divided by the total length of the short side 21b is equal to 9% to 27%. In practice, the present disclosure may apply to the over-current protection device with any size model (or form factor), such an SMD over-current protection device with a model (or form factor) 0402, 0603, 0805, 1206 or other size models (or form factors). For example, when the model of the over-current protection device 30 is 0402, the long side 21a ranges from 40 mil to 50 mil, and the short side 21b ranges from 20 mil to 30 mil; and the over-current protection device 30 has the first distance D1 ranging from 5.74% to 15.12% and the second distance D2 ranging from 10.48% to 27.61%. When the model of the over-current protection device 30 is 0603, the long side 21a ranges from 60 mil to 70 mil, and the short side 21b ranges from 30 mil to 40 mil; and the over-current protection device 30 has the first distance D1 ranging from 4.94% to 12.31% and the second distance D2 ranging from 9.46% to 23.57%. When the model of the over-current protection device 30 is 0805, the long side 21a ranges from 80 mil to 90 mil, and the short side 21b ranges from 50 mil to 60 mil; and the over-current protection device 30 has the first distance D1 ranging from 3.56% to 6.67% and the second distance D2 ranging from 5.43% to 10.19%. When the model of the over-current protection device 30 is 1206, the long side 21a ranges from 120 mil to 130 mil, and the short side 21b ranges from 60 mil to 70 mil; and the over-current protection device 30 has the first distance D1 ranging from 3.00% to 4.97% and the second distance D2 ranging from 5.95% to 9.86%.

Please refer to FIG. 3a and FIG. 3b. The first electrode 26a has the width W extending along the long side 21a, a length L extending along the short side 21b, and a height H extending away from the first insulation layer 21. The first electrode 26a has a bottom with the width W and the length L, and has a sidewall with the height H. The bottom of the first electrode 26a is parallel to the bottom surface S1, and the sidewall of the first electrode 26a extends away from the bottom surface S1. In an embodiment, the encapsulation layer 28 is not physically in contact with the first electrode 26a. However, in other embodiments, the encapsulation layer 28 may be designed to be in contact with part of the first electrode 26a, as long as the height H of the first electrode 26a is further adjusted to at least 50 μm, and may be equal to or less than 120 μm. In this way, the encapsulation layer 28 may merely attach to the sidewall of the first electrode 26a and would not contact the bottom of the first electrode 26a owing to the increased height H of the first electrode 26a, by which the welding quality would not be compromised. In an embodiment, in order to have a better welding quality, the width W ranges from 0.1 mm to 0.5 mm, and the height H ranges from 12 μm to 120 μm. The second electrode 26b may have same design as the first electrode 26a as described above. Besides, all the parameters of the second electrode 26b may be the same as or different from those of the first electrode 26a.

Please further refer to FIG. 3c and FIG. 3d, which show the enlarged sectional views of the over-current protection device 30 shown in FIG. 2b in accordance with alternative embodiments. The structure of the encapsulation layer 28 around the corner of the first insulation layer 21 in FIG. 3c or FIG. 3d is different from that in FIG. 3a. In FIG. 3c, the encapsulation layer 28 forms the bending structure having an arcuate shape at the corner of the first insulation layer 21 as seen in cross-sectional view. In other words, the encapsulation layer 28 extends from the first sidewall S2 to the bottom surface S1 with an arc-shaped bending structure therebetween, and hence the angle between extending portion and vertical portion of the encapsulation layer 28 is not 90° but is acute or obtuse. If the angle is or almost 90° as shown in FIG. 3a, the bending structure is more easily to rupture in case that there is any external impact exerted thereon. Therefore, the bending structure can be designed with an arc shape, and the structural integrity of the device is further improved besides the advantages of inaccessible to the environmental factors described above. As for FIG. 3d, it is shown that, depending on some specific design requirements, there could be a plurality of turning points at the corner linking the bottom surface S1 and the first sidewall S2, and/or at the corner linking the upper surface S3 and the second sidewall S4. Depending on the design requirements, all these shapes of bending structure are not limited in the present invention. In other words, the bending structure of the present disclosure may be varied as long as the interface between the encapsulation layer 28 and the first sidewall S2 does not go straight down to the external environment.

The process of the present disclosure is described as follows for ease of understanding of the improvement in respect to packaging structure. FIG. 4a shows a process flow 40 of manufacturing the over-current protection device in accordance with prior art. FIG. 4b shows a process flow 50 of manufacturing the over-current protection device in accordance with the present invention.

Figure 1A:
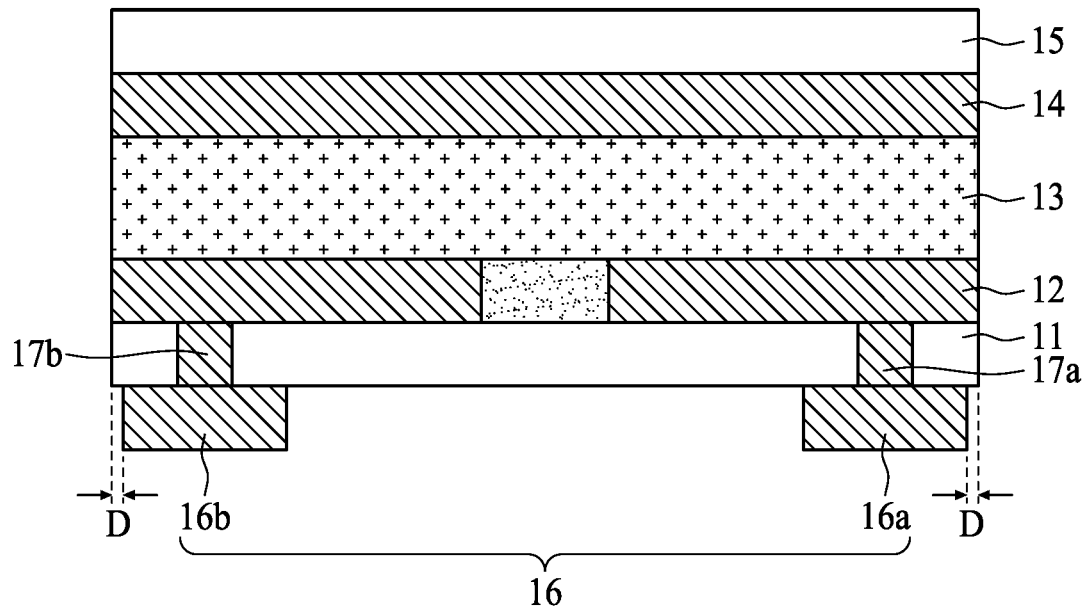
FIG. 1a shows a cross-sectional view of a first conventional over-current protection device.
Figure 1B:
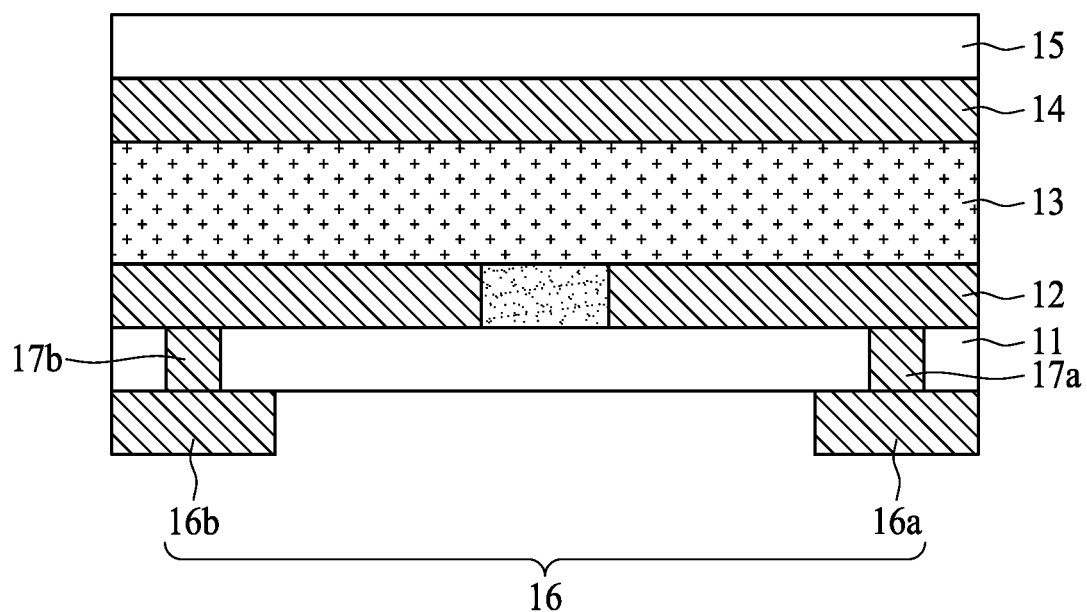
FIG. 1b shows a cross-sectional view of a second conventional over-current protection device.

Please refer to FIG. 4a, in which the process flow 40 is shown in top view, and the first insulation layer 11 is processed to form the outer electrode 16 thereon through a step 31, a step 32, and a step 33. First, the first electrically conductive layer 12, the PTC material layer 13, the second electrically conductive layer 14, and the second insulation layers 15 are stacked sequentially below the first insulation layer 11. Then, at the step 31, two metal plates are placed on the first insulation layer 11 and the second insulation layers 15 (refer to FIG. 1a), respectively, and a hot-pressing process is performed to form a laminated plate. The laminated plate has an electrode layer 16' to be processed later to form the outer electrode 16. At the step 32, the electrode layer 16' is etched, drilled, and electroplated or treated using other means for establishing electrical connection to form the outer electrode 16, by which the outer electrode 16 is electrically connected to the first electrically conductive layer 12 below. At the step 33, the processed laminated plate is diced into a plurality of pieces to form plural over-current protection devices 10 (e.g, four devices 10 as shown in FIG. 1a) by a cutter, or using laser or other dicing means along the dicing lines DL as indicated by dashed lines. It is noted that in FIG. 4a, a gap between one outer electrode 16 and another adjacent outer electrode 16 is almost equal to the thickness of the dicing equipment (e.g., cutter). More specifically, the gap is formed by etching the electrode layer 16', and its width is made minimum for the purpose of indicating the dicing location only. The width of the gap is basically equal to the thickness of the cutter, that is, there would be no extra space reserved in the gap for any other purposes.

Please refer to FIG. 4b, in which the process flow 50 is shown in top view. The first insulation layer 21, an electrode layer 26', and the outer electrode layer 26 may be processed in a similar way to that described for the step 31, the step 32, and the step 33. Compared with the FIG. 4a, the etching process in FIG. 4b is different and the outer electrodes 26 are formed to have a larger interval therebetween, by which the first distance D1 and the second distance D2 are formed. After dicing, the over-current protection devices are coated with the encapsulation layer 28. To put it simply, the etched line width in FIG. 4b is larger than the etched line width in FIG. 4a, by which the encapsulation layer 28 of the present disclosure may be formed without contacting the first electrode 26a. The first electrode 26a may have its height raised to the specific range that prevents the encapsulation layer 28 from extending to the bottom thereof, even if the encapsulation layer 28 is coated to accidentally contact the sidewall of the first electrode 26a. Therefore, the encapsulation layer 28 of the present disclosure do not influence the welding quality, and the extended distance can provide more space to accommodate the encapsulation layer 28 which serves as an isolation layer to prevent PTC material layer from being influenced by adverse environmental factors.

To verify the function effects generated by the present disclosure, please see experimental data in Table 1 and Table 2 as shown below.

TABLE 1

| Group | Model (form factor) | Extended distance (mil) | Extended distance compared to long side (%) | Extended distance compared to short side (%) | Electrical resistance fluctuation >20% (%) | Mounting passing rate (%) |
|---|---|---|---|---|---|---|
| C1 | 0402 | <2.41 | 5.74 | 10.48 | 41 | 88 |
| C2 | 0603 | <3.31 | 4.94 | 9.46 | 33 | 89 |
| C3 | 0805 | <2.88 | 3.56 | 5.43 | 38 | 89 |
| C4 | 1206 | <3.87 | 3.00 | 5.95 | 39 | 92 |
| E1 | 0402 | 2.41 | 5.74 | 10.48 | 17 | 94 |
| E2 | | 3.26 | 7.76 | 14.17 | 16 | 95 |
| E3 | | 4.52 | 10.76 | 19.65 | 18 | 96 |
| E4 | | 5.45 | 12.98 | 23.70 | 17 | 99 |
| E5 | | 6.35 | 15.12 | 27.61 | 17 | 95 |
| E6 | 0603 | 3.31 | 4.94 | 9.46 | 12 | 92 |
| E7 | | 5.58 | 8.76 | 16.76 | 11 | 94 |
| E8 | | 6.32 | 9.43 | 18.06 | 12 | 96 |
| E9 | | 7.30 | 10.90 | 20.86 | 10 | 99 |
| E10 | | 8.25 | 12.31 | 23.57 | 11 | 93 |
| E11 | 0805 | 2.88 | 3.56 | 5.43 | 14 | 93 |
| E12 | | 3.15 | 3.88 | 5.94 | 12 | 94 |
| E13 | | 3.96 | 4.88 | 7.46 | 13 | 96 |
| E14 | | 4.40 | 5.43 | 8.30 | 10 | 99 |
| EIS | | 5.40 | 6.67 | 10.19 | 11 | 92 |
| E16 | 1206 | 3.87 | 3.00 | 5.95 | 13 | 95 |
| E17 | | 4.32 | 3.35 | 6.65 | 14 | 95 |
| E18 | | 5.21 | 4.04 | 8.02 | 14 | 96 |
| E19 | | 6.10 | 4.73 | 9.38 | 14 | 99 |
| E20 | | 6.41 | 4.97 | 9.86 | 14 | 94 |

As shown in Table 1, Groups C1 to C4 represent comparative examples C1 to C4, and Groups E1 to E20 represent examples E1 to E20 of the present invention. Four models of the over-current protection device are chosen, and their electrical resistance fluctuation and mounting passing rate are tested under different extended distances for coating of encapsulation layer. In other words, comparative examples C1 to C4 and examples E1 to E20 are coated with the encapsulation layer 28 under the different extended distances, and their electrical resistance fluctuation and mounting passing rate are tested. Details are described below.

Regarding the size (long side×short side) in top view, model 0402 has a size about 42 mil×23 mil, model 0603 has a size about 67 mil×35 mil, model 0805 has a size about 81 mil×53 mil, and model 1206 has a size about 129 mil×65 mil.

The "extended distance" refers to the distance from the first electrode 26a (or the second electrode 26b) to the edge of the first insulation layer 21. Taking E1 for example, the extended distance is 2.41 mil, which means that both the first distance D1 and the second distance D2 from the first electrode 26a are 2.41 mil, and the extended distances from the second electrode 26b to the long side 21a and to the short side 21b are 2.41 mil. The extend distances in other groups have the same meaning. It should be noted that there may be deviation during the dicing process at the step 33 as shown in either FIG. 4a or FIG. 4b, and not all the extended distances are actually equidistant from the outer electrode 26 to the edge of the first insulation layer 21 under mass production. For example, the first electrode 26a is spaced apart from the edge of the first insulation layer 21 by the first distance D1 and the second distance D2, and the first distance D1 may be the same as or different from the second distance D2. However, in order to obtain an accurate result, the over-current protection devices in each group of Table 1 are selected with the equidistant extended distance (i.e., the first distance is equal to the second distance D2), and each group takes 10 over-current protection devices to be tested.

In addition, "extended distance compared to long side" refers to the value obtained by dividing the extended distance by the total length of the long side 21a and represented in percentage; and "extended distance compared to short side" refers to the value obtained by dividing the extended distance by the total length of the short side 21b and represented in percentage.

The "electrical resistance fluctuation" refers to the change of electrical resistance of the coated device after treatment under high temperature with high humidity. More specifically, the sample (coated device) to be tested is measured to obtain a first electrical resistance under room temperature. The same sample is then placed in an interior space of an apparatus which has an environment of 85° C. with relative humidity about 85% for a duration of 336 hours, thereby simulating the environment of high temperature with high humidity. Thereafter, the sample after treatment is taken out of the apparatus and placed under room temperature for a duration of 1 hour, and the sample is measured to obtain a second electrical resistance. An absolute value of subtracting the first electrical resistance from the second electrical resistance can be obtained. A value then can be obtained by dividing the absolute value by the first electrical resistance and is represented in percentage, which is the electrical resistance fluctuation.

The "mounting passing rate" refers to the yield rate of mounting device to the circuit board, and is used to assess the welding quality between the outer electrode and the welding pad on the circuit board. More specifically, the standard for passing the quality check is described as follows. First, the outer electrode is aligned with the welding pad without parallel shift in top view. Second, the outer electrode is aligned with the welding pad without rotation in top view. Third, the entire structure of the over-current protection device is firmly and steadily fixed after welding, and with no structural instability or looseness. Fourth, if the over-current protection device has notches e.g., where the conductive members 27a, 27b locate) for solder climbing, the solder must climb at least a quarter of the notch's height.

Please refer to Table 1 again. The comparative examples C1 to C4 select models (or form factors) 0402, 0603, 0805, and 1206 for the experiment, and there is no extra space reserved for coating in these four comparative examples, the extended distances of which are merely made by error. As for examples E1 to E20, they also select models (or form factors) 0402, 0603, 0805, and 1206 for the same test, but there are five different extended distances for each model to be coated and tested.

In the comparative examples C1 to C4, it is observed that, after coating and treatment under high temperature with high humidity, the over-current protection devices having electrical resistance fluctuation higher than 20% account for 33% to 41% of all the tested devices. That is, for every 100 over-current protection devices, there will be 33 to 41 over-current protection devices with electrical resistance fluctuation higher than 20%. As for mounting passing rate of the comparative examples C1 to C4, it ranges from 88% to 92%.

In the examples E1 to E20, it is observed that, after coating and treatment under high temperature with high humidity, the over-current protection devices having electrical resistance fluctuation higher than 20% account for only 10% to 18% of all the tested devices. As for mounting passing rate of the examples E1 to E20, it still maintains higher than 90%, which ranges from 92% to 99%. More specifically, in the examples E1 to E5, the over-current protection devices which have electrical resistance fluctuation higher than 20% account for 16% to 18%, and the mounting passing rate maintains in the range from 94% to 99%, if the extended distance of model 0402 is set in the range from 2.41 mil to 6.35 mil; in the examples E6 to E10, the over-current protection devices which have electrical resistance fluctuation higher than 20% account for 10% to 12%, and the mounting passing rate maintains in the range from 92% to 99%, if the extended distance of model 0603 is set in the range from 3.31 mil to 8.25 mil; in the examples E11 to E15, the over-current protection devices which have electrical resistance fluctuation higher than 20% account for 10% to 14%, and the mounting passing rate maintains in the range from 92% to 99%, if the extended distance of model 0805 is set in the range from 2.88 mil to 5.40 mil; and in the examples E16 to E20, the over-current protection devices which have electrical resistance fluctuation higher than 20% account for 13% to 14%, and the mounting passing rate maintains in the range from 94% to 99%, if the extended distance of model 1206 is set in the range from 3.87 mil to 6.41 mil.

Regarding electrical resistance fluctuation, the examples E1 to E20 have less fluctuation because of the encapsulation layer 28. The encapsulation layer 28 not only covers the corner of the first insulation layer 21 but also further conformally extends to the bottom surface S1 of the first insulation layer 21. Such structure design makes the environmental factors difficult to access to the interior of the over-current protection device 30 through the interface between the first insulation layer 21 and the encapsulation layer 28. Regarding mounting passing rate, the examples E1 to E20 have higher rates passing the quality check compared with the comparative examples C1 to C4 after coating. The extended distances of the comparative examples C1 to C4 are too low, and the coated encapsulation layer 28 may easily contact the outer electrode 26 and even overflow beyond the edge of the outer electrode 26. When the encapsulation layer 28 overflows beyond the edge of the outer electrode 26 and it is cured then, the bottom of the outer electrode 26 is uneven which easily makes the device shift or deviate from where it needs to be welded. On the contrary, if the extended distance is adjusted to have a larger value and more space is reserved for coating, the encapsulation layer 28 can smoothly extend on the bottom surface S1, by which the entire structure of the device is symmetric, and the bottoms of the electrodes 26a and 26b are flush with each other. To sum up, the present invention can reduce electrical resistance fluctuation while maintaining excellent mounting passing rate as long as the extended distance is set in the range from about 2 mil to 9 mil.

Besides, the coating of the encapsulation layer 28 on the bottom surface S1 or the upper surface S3 is beneficial to quality control. For the to efficiency of mass production, an image sensor (e.g., CCD) is conventionally used and merely checks the defect on the top surface or bottom surface (as like in top view of FIG. 2a or in bottom view of FIG. 2c) of the device during the process. If the coating of the encapsulation layer 28 stops at the first sidewall S2 or the second sidewall S4, the image sensor would not check the defect of the encapsulation layer 28 during the process. However, if the coating of the encapsulation layer 28 further extends to the bottom surface S1 or the upper surface S3, the first insulation layer 21 or the second insulation layer 25 would be covered with sufficient amount of it on the bottom or top for the defect check. Moreover, there is some probability that the encapsulation layer 28 would also have the defect on the first sidewall S2 or the second sidewall 84 as the defect (e.g., non-uniform coating with cracks and holes) of the encapsulation layer 28 exists on the bottom surface S1 or the upper surface S3. Therefore, the structure design of the present invention is beneficial to quality control.

Next, please refer to Table 2 for further verify the present invention in respect of the improvement in design. The extended distances are not equidistant from the electrode to the edge of the first insulation layer 21, and the electrical resistance fluctuation and mounting passing rate are also measured after coating.

TABLE 2

| Group | Model (form factor) | Extended distance (mil) | | | | Electrical resistance fluctuation >20% (%) | Mounting passing rate (%) |
|---|---|---|---|---|---|---|---|
| | | Left side | Right side | Upper side | Lower side | | |
| E21 | 0402 | 3.742 | 3.541 | 4.476 | 3.587 | 14 | 96 |
| E22 | | 4.134 | 3.893 | 4.598 | 4.487 | 17 | 98 |
| E23 | | 3.276 | 4.679 | 2.877 | 5.035 | 16 | 99 |
| E24 | 0603 | 5.145 | 5.565 | 3.685 | 7.295 | 12 | 98 |
| E25 | | 6.371 | 5.264 | 6.768 | 6.994 | 11 | 98 |
| E26 | | 5.114 | 4.132 | 3.459 | 6.693 | 10 | 99 |
| E27 | 0805 | 3.955 | 3.685 | 4.135 | 3.136 | 12 | 97 |
| E28 | | 2.876 | 4.314 | 3.595 | 3.595 | 13 | 98 |
| E29 | | 2.876 | 4.135 | 4.045 | 3.126 | 13 | 99 |
| E30 | 1206 | 5.214 | 5.363 | 3.873 | 6.406 | 14 | 96 |
| E31 | | 4.618 | 5.810 | 5.214 | 5.512 | 13 | 98 |
| E32 | | 5.512 | 4.410 | 3.873 | 6.108 | 12 | 99 |

The model (form factor), electrical resistance fluctuation, and mounting pass rate are defined in the same way as described above in Table 1. The difference exists in the extended distance. The extended distance at left side, right side, upper side, or lower side refer to the distance from the outer electrode 26 to the left edge, right edge, upper edge, or lower edge of the first insulation layer 21 in top view. More specifically, in FIG. 2c, the extended distance at left side refer to the distance from the second electrode 26b to the left short side 21b; the extended distance at right side refer to the distance from the first electrode 26a to the right short side 21b; the extended distance at upper side refer to the distance from the first electrode 26a (or second electrode 26b) to the upper long side 21a, and the extended distance at lower side refer to the distance from the first electrode 26a (or second electrode 26b) to the lower long side 21a. It is noted that the extended distances from the outer electrode 26 to the edge of the first insulation layer 21 are equidistant in Table 1, but that are not equidistant in Table 2. The experiment tests three different combinations of the extended distances for each model. For example, in the examples E21, E24, E27 and E30, the extended distance at left side is almost equal to the extended distance at right side, but the extended distance at upper side is quite different from the extended distance at lower side; in the examples E22, E25, E28 and E31, the extended distance at left side is quite different from the extended distance at right side, but the extended distance at upper side is almost equal to the extended distance at lower side; and in the examples E23, E26, E29 and E32, the extended distance at left side is quite different from the extended distance at right side, and also the extended distance at upper side is quite different from the extended distance at lower side.

In Table 2, it is well understood that the present invention can reduce electrical resistance fluctuation while maintaining excellent mounting passing rate as long as the extended distance is set in the range from about 2 mil to 9 mil, although the design of the first electrode 26a and the second electrode 26b are asymmetric. Regarding the examples E21 to E32, the over-current protection devices having electrical resistance fluctuation higher than 20% account for 10% to 17% of all the tested devices, and the mounting passing rate maintains in the range from 96% to 99%. The reasons having better technical effect are the same as and discussed above in Table 1.

Figure 5A:
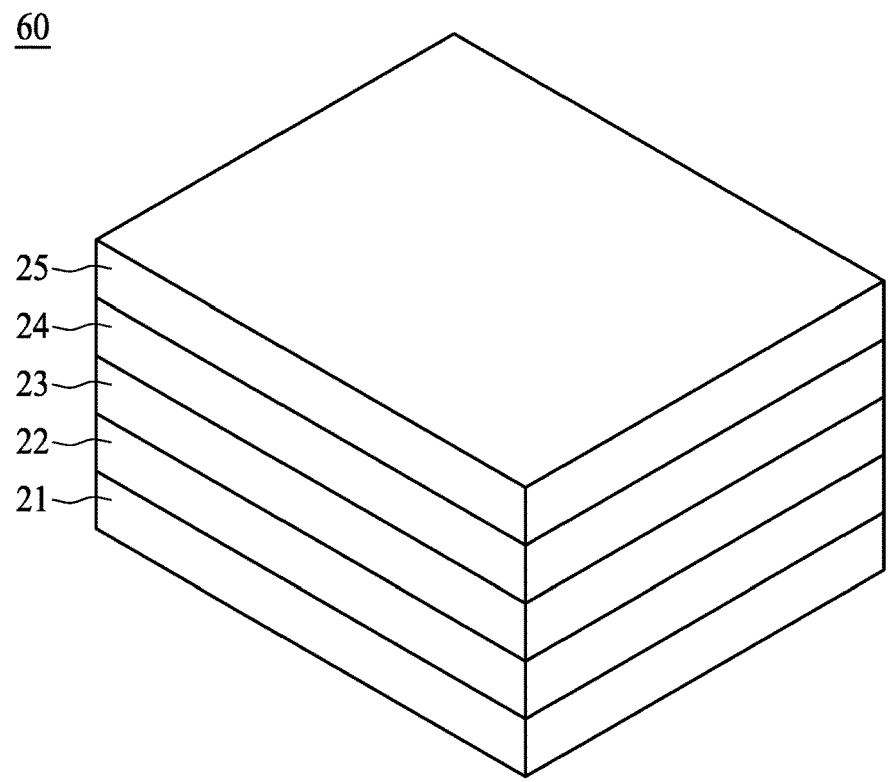
FIG. 5a shows a three-dimensional view of the over-current protection device before forming the encapsulation layer in accordance an embodiment with the present invention.
Figure 5A:
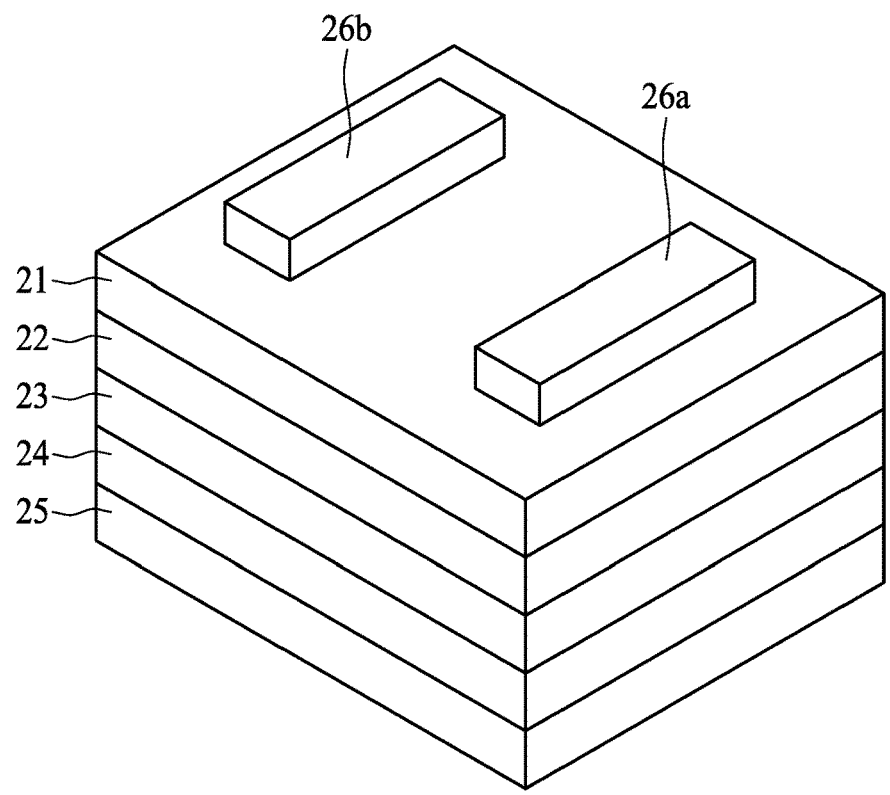
Figure 5B:
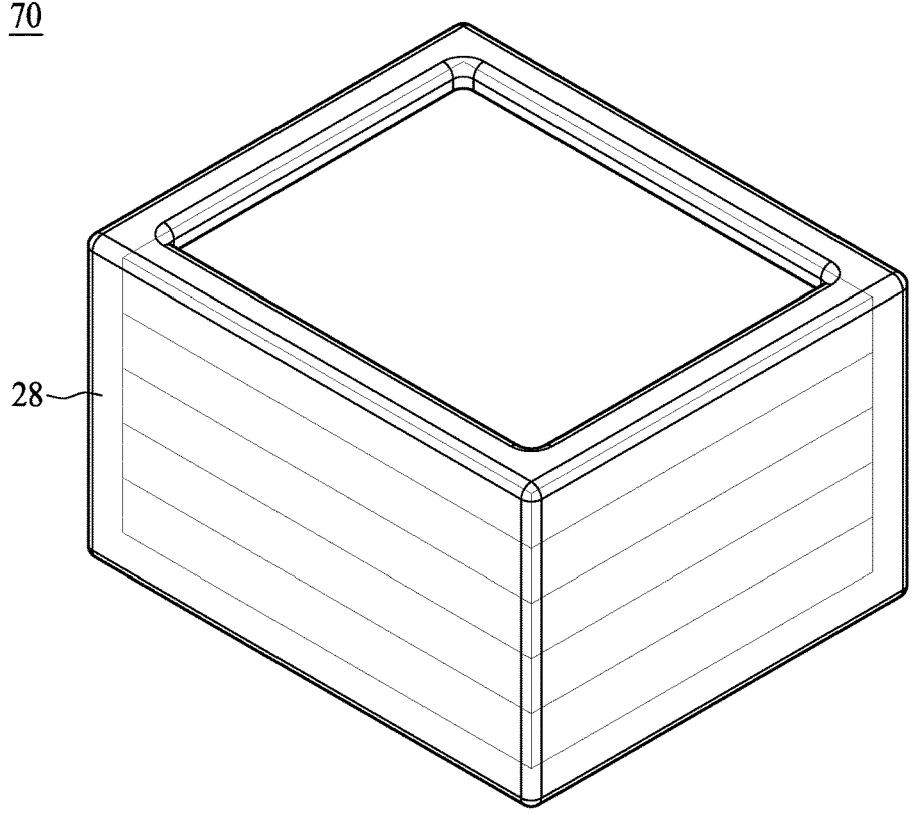
FIG. 5b shows a three-dimensional view of the over-current protection device after forming the encapsulation layer in accordance with an embodiment the present invention.
Figure 5B:
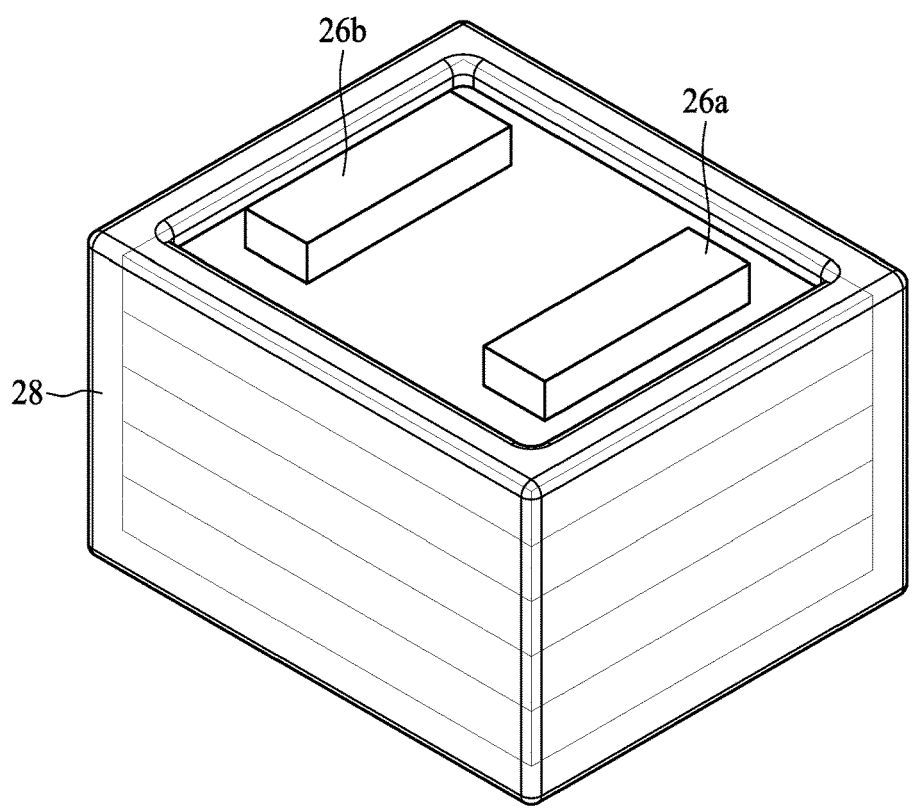
Figure 5C:
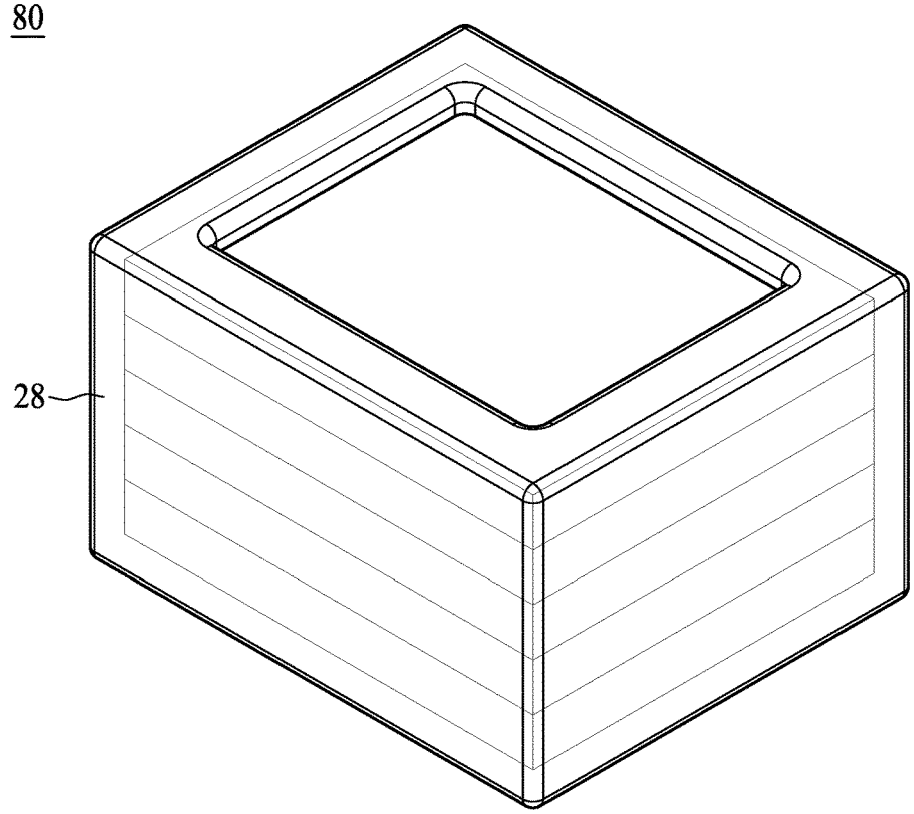
FIG. 5c shows a three-dimensional view of the over-current protection device after forming the encapsulation layer in accordance with another embodiment of the present invention.
Figure 5C:
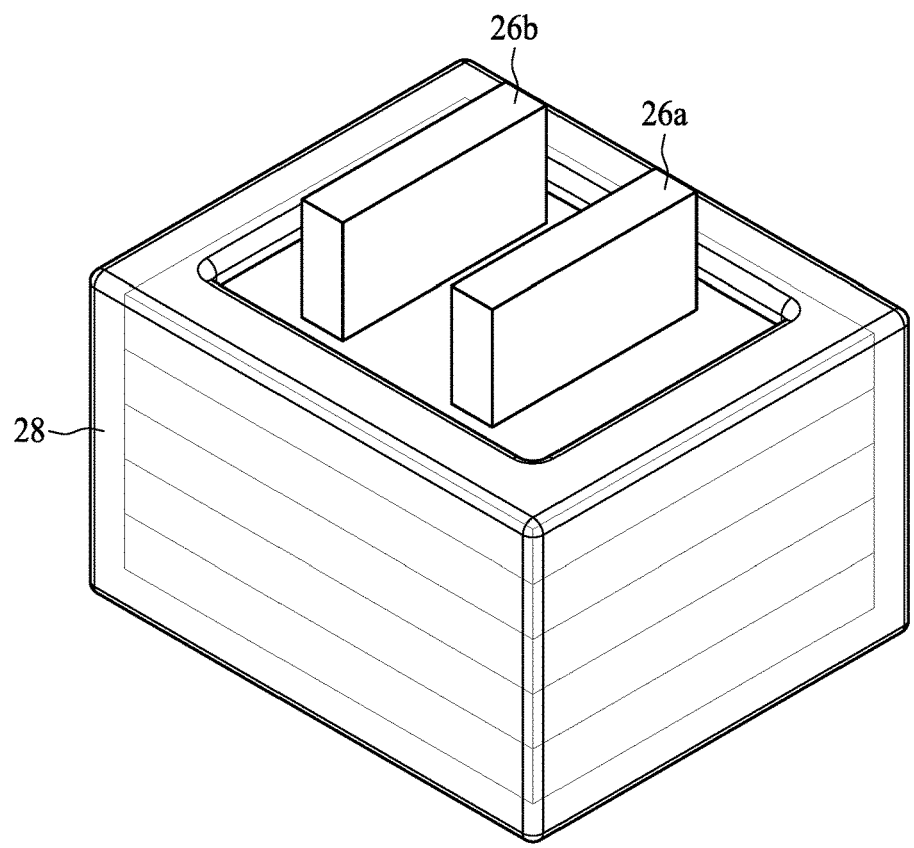

Please refer to FIG. 5a to FIG. 5c, in which the over-current protection devices in 3D view are illustrated. In FIG. 5a to FIG. 5c, the first insulation layer 21, the first electrically conductive layer 22, the PTC material layer 23, the second electrically conductive layer 24, the second insulation layer 25, the first electrode 26a, the second electrode 26b, and the encapsulation layer 28 are discussed above, and are not described in detail herein. In FIG. 5a, the upper figure illustrates an over-current protection device 60 in 3D view and in the orientation that the second insulation layer 25 faces up, and the lower figure illustrates the over-current protection device 60 in 3D view and in the orientation that the outer electrode 26 faces up. Clearly, the first electrode 26a and second electrode 26b are distant from the edge of the first insulation layer 21 of the over-current protection device 60 without coating of the encapsulation layer 28. Please refer to FIG. 5b, in which the over-current protection device 70 is substantially the same as the over-current protection device 60. Compared with the over-current protection device 60, the over-current protection device 70 is packaged with the encapsulation layer 28 outside the device. In FIG. 5b, the upper figure illustrates that the encapsulation layer 28 covers the upper surface of the second insulation layer 25 along the edge, and exposes the center portion of the second insulation layer 25. In FIG. 5b, the lower figure illustrates that the encapsulation layer 28 covers the bottom surface of the first insulation layer 21 along the edge, and exposes the center portion of the first insulation layer 21. The encapsulation layer 28 is not in contact with the first electrode 26a and second electrode 26b. In FIG. 5c, the over-current protection device 80 is substantially the same as the over-current protection device 70. Compared with the over-current protection device 70, the distances from the first electrode 26a and second electrode 26b to both sides (long side and short side) of the over-current protection device 80 are further extended, and the first electrode 26a and the second electrode 26b are raised in height. If the distance from the outer electrode 26 to the edge of the first insulation layer 21 is extended, the first electrode 26a and the second electrode 26b would be moved closer to each other for maintaining the same width for welding. However, there is a minimum limit to the distance between the first electrode 26a and the second electrode 26b when it comes to electric arc as described above. If the distance between the first electrode 26a and the second electrode 26b reaches the minimum limit, the width of the first electrode 26a and the second electrode 26b can be moderately narrowed as long as they are raised in height. The first electrode 26a and the second electrode 26b may have larger exposed area for welding if they are raised in height. Besides, the first electrode 26a and the second electrode 26b may have sufficient welding area even if the encapsulation layer 28 is accidentally coated on the sidewalls of the first electrode 26a and the second electrode 26b.

Figure 6A:
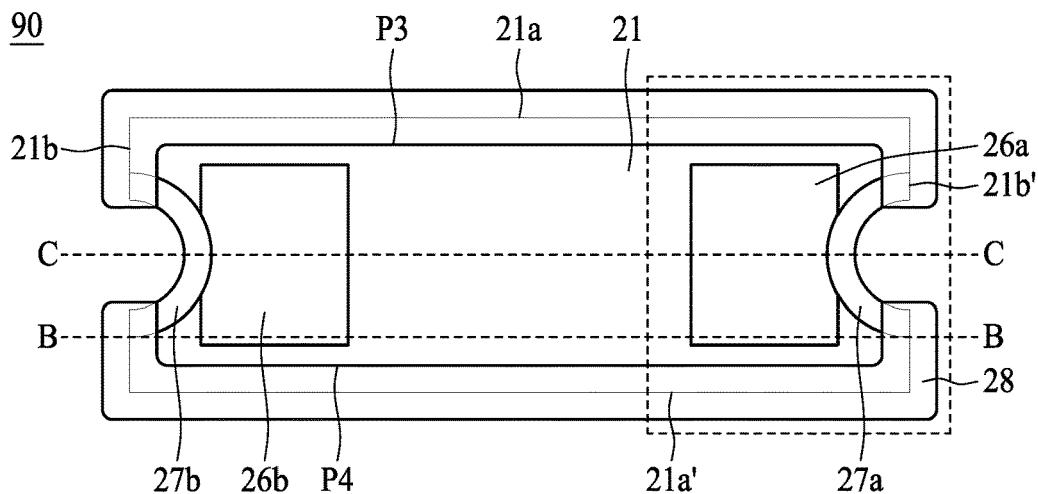
FIG. 6a shows a top-view and a bottom view of an over-current protection device in accordance with a second aspect of the present invention.
Figure 6B:
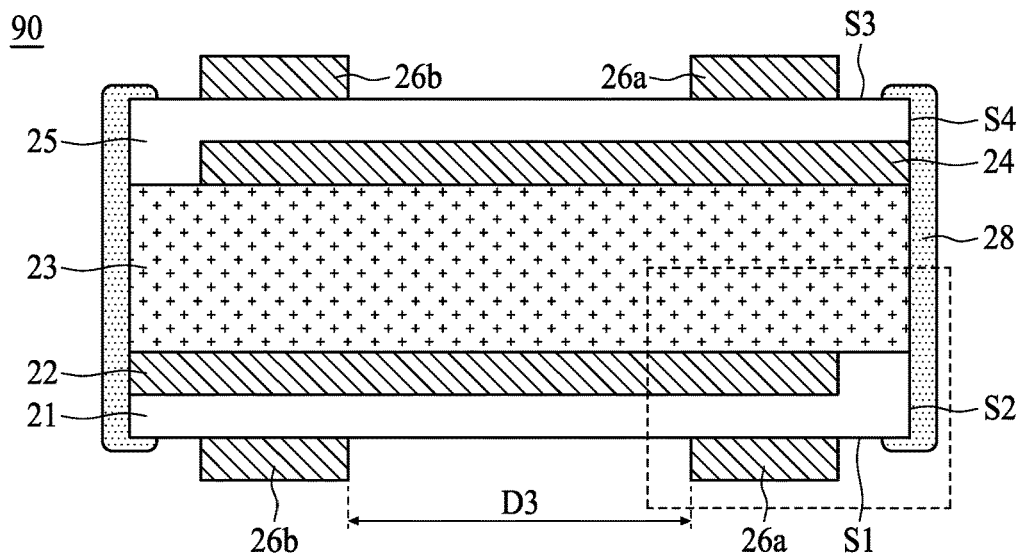
Figure 6C:
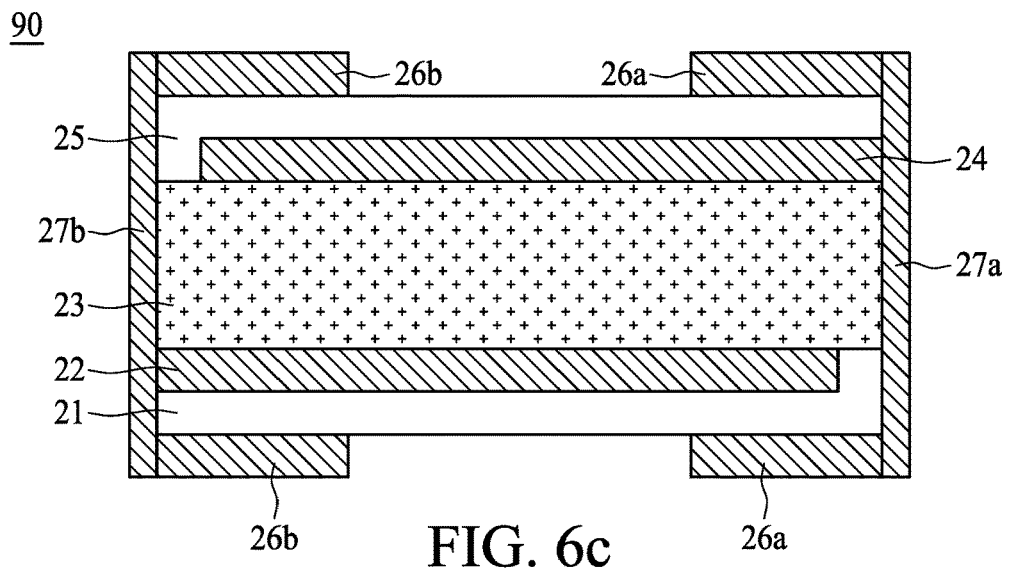

Please refer to FIGS. 6a-6e. FIGS. 6a-6e show a second aspect of the present invention, and this aspect illustrates that the SMD over-current protection device may have notches for solder climbing. FIG. 6a shows a top view and a bottom view of an over-current protection device 90. The design of its top and bottom are the same, so they are illustrated in the same way either in the top view or the bottom view. FIG. 6b shows a cross-sectional view along the dashed line BB in FIG. 6a, and FIG. 6c shows a cross-sectional view along the dashed line CC in 6a.

In FIG. 6b, the over-current protection device 90 includes a resistor element, an outer electrode 26, and an encapsulation layer 28. The resistor element has a first insulation layer 21, a first electrically conductive layer 22, a positive temperature coefficient (PTC) material layer 23, a second electrically conductive layer 24 and a second insulation layer 25 stacked sequentially from bottom to top. The resistor element further has a left notch and a right notch at a left end and a right end thereof respectively. The first insulation layer 21 has a bottom surface S1 and a first sidewall S2 connected to the bottom surface S1. The second insulation layer 25 has an upper surface S3 opposite to the bottom surface S1 and a second sidewall S4 connected to the upper surface 53. The left notch is disposed at the left end of the resistor element, and extends from the bottom surface S1 to the upper surface S3 at the left end. The right notch is disposed at the right end of the resistor element, and extends from the bottom surface S1 to the upper surface S3 at the right end. The appearance of the resistor element substantially shows a hexahedral structure with top/bottom surfaces and four side surfaces (front/rear surfaces and surfaces where the notches locate). The top surface of the resistor element is the upper surface S3 of the second insulation layer 25, and the bottom surface of the resistor element is the bottom surface S1 of the first insulation layer 21. After stacking, the first electrically conductive layer 22, the PTC material layer 23, and the second electrically conductive layer 24 are laminated between the first insulation layer 21 and the second insulation layer 25 with only four sides exposed and to be covered by the encapsulation layer 28. Such four sides form a peripheral sidewall. The peripheral wall, the first sidewall S2 of the first insulation layer 21, and the second sidewall S4 of the second insulation layer 25 together form the four side surfaces of the resistor element. The first insulation layer 21, the PTC material layer 23, the second insulation layer 25, and the composition of the encapsulation layer 28 may be the same as described above.

The outer electrode 26 has a first electrode 26a and a second electrode 26b. The first electrode 26a is electrically connected to the second electrically conductive layer 24 and disposed on the upper surface 53 and the bottom surface S1 at the right end. The second electrode 26b is electrically connected to the first electrically conductive layer 22 and disposed on the upper surface S3 and the bottom surface S1 at the left end. Therefore, the first electrode 26a is electrically isolated from the second electrode 26b. Please refer to FIG. 6a and FIG. 6c, in which the over-current protection device 90 further includes a left conductive member 27b disposed in the left notch, and a right conductive member 27a disposed in the right notch. The first electrode 26a is electrically connected to the second electrically conductive layer 24 through the right conductive member 27a, and is electrically isolated from the first electrically conductive layer 22. The second electrode 26b is electrically connected to the first electrically conductive layer 22 through the left conductive member 27b and is electrically isolated from the second electrically conductive layer 24.

Please refer to FIG. 6a and FIG. 6b, in which the encapsulation layer 28 covers the first sidewall S2 and extends to a part of the bottom surface S1 of the first insulation layer 21, thereby forming a perimeter discontinuously extending on the bottom surface S1 of the first insulation layer 21. The perimeter consists of a first perimeter part P3 and a second perimeter part P4, as shown in FIG. 6a. The first electrode 26a and the second electrode 26b are located inside a region encircled by the perimeter discontinuously extending on the bottom surface S1. The encapsulation layer 28 may further cover the second sidewall S4 and extend to a part of the upper surface S3, thereby forming a perimeter discontinuously extending on the upper surface S3 of the second insulation layer 25. The perimeter on the upper surface S3 have the same configuration as the perimeter on the bottom surface S1, which means the perimeter on the upper surface S3 also consists of two perimeter parts such as the first perimeter part P3 and the second perimeter part P4. The first electrode 26a and the second electrode 26b are located inside a region encircled by the perimeter discontinuously extending on the upper surface S3. Therefore, the resistor element only exposes a center portion of the upper surface S3 and a center portion of the bottom surface S1 to external environment. It is noted that this aspect has the symmetric top and bottom, and the top view and the bottom view can be illustrated the same as in FIG. 6a.

Please refer to FIG. 6a, in which the bottom surface S1 of the first insulation layer 21 has two long sides 21a and 21a', and two short sides 21b and 21b'. The upper half of the short sides 21b and 21b' connects to the long side 21a, and the lower half of the short sides 21b and 21b' connects to the long side 21a'. The first perimeter part P3 continuously extends along the long side 21a to the upper half of the short sides 21b and 21b', and the second perimeter part P4 continuously extends along the long side 21a' to the lower half of the short sides 21b and 21b'. Because the encapsulation layer 28 discontinuously extends along the short sides 21b and 21b' to the left conductive member 27b and the right conductive member 27a, respectively, the left conductive member 27b and the right conductive member 27a are not fully covered by the encapsulation layer 28 on the bottom surface S1. More specifically, the first insulation layer 21 has the long side 21a and the long side 21a' opposite to each other at upper and lower side, and has the short side 21b and the short side 21b' opposite to each other at left and right side. Because of the left notch at the left end, the short side 21b is substantially not straight and extends in an arc in the middle part thereof. Because of the right notch at the right end, the short side 21b' is substantially not straight and extends in an arc in the middle part thereof. In an embodiment, the notch may be half round or elliptic as viewed from top or bottom as shown in FIG. 6a. When the encapsulation layer 28 is coated on the over-current protection device 90, the encapsulation layer 28 is discontinuous at the left and right ends owing to the notches. In other words, at the left end, the encapsulation layer 28 straight extends along the short side 21b, and covers part of the bottom surface S1 and part of the left conductive member 27b. Because of the left notch, the encapsulation layer 28 is in shape of a discontinuous straight strip on the short side 21b. At the right end, the encapsulation layer 28 straight extends along the short side 21b', and covers part of the bottom surface S1 and part of the right conductive member 27a. Because of the right notch, the encapsulation layer 28 is in shape of a discontinuous straight strip on the short side 21b'.

Figure 6D:
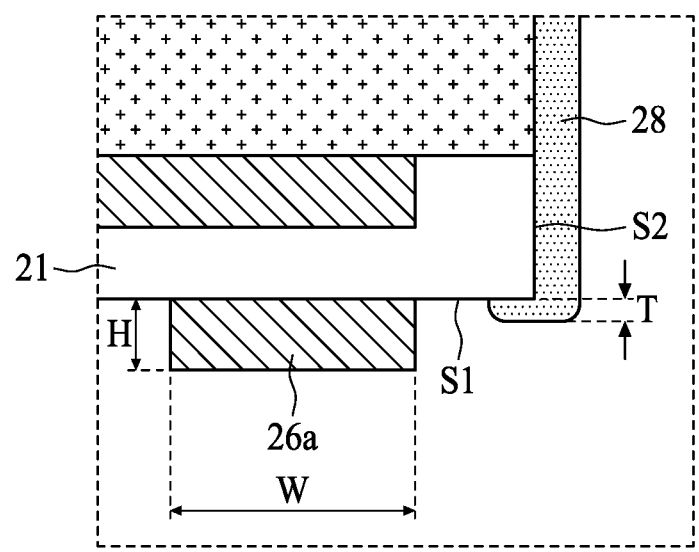
FIG. 6d shows an enlarged sectional view of the over-current protection device shown in FIG. 6b.
Figure 6E:
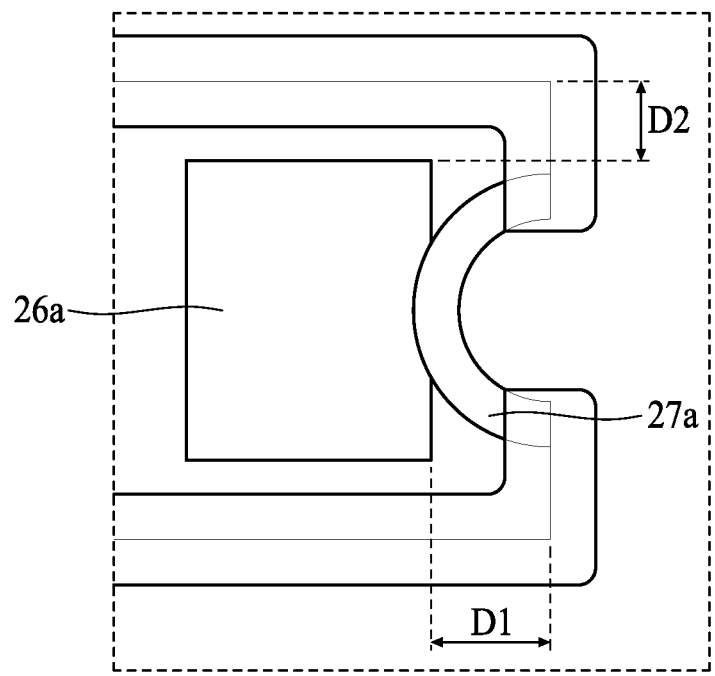

Please refer to FIG. 6d and FIG. 6e, which are enlarged sectional views to as shown in FIG. 6b and FIG. 6a, respectively. The over-current protection device 90 also has a specific width W, height H and length L of the outer electrode 26. Regarding the configuration, the first electrode 26a (or the second electrode 26b) is spaced apart from the short side 21b (or the short side 21b') and the long side 21a (or the long side 21a') of the first insulation layer 21 (or the second insulation layer 25) by a first distance D1 and a second distance D2. The width W, the height H, the length L, the first distance 171, and the second distance D2 may be the same as described above, and are not described in detail herein.

Although the present disclosure is exemplified by the first aspect and the second aspect described above, the application of the present disclosure is not limited thereto. The present disclosure may apply to any SMD over-current protection devices as long as the device is coated with the encapsulation layer to reduce electrical resistance fluctuation while maintaining excellent mounting passing rate. For example, Applicant disclosed many SMD over-current protection devices in a Taiwan Patent No. 1282696 filed on Dec. 27, 2005, and the present disclosure can apply to those SMD over-current protection devices. The Taiwan Patent is referred to herein for reference.

As described above, the present disclosure provides the over-current protection device with the extended distance from its edge to the outer electrode 26. On the surface where the outer electrode 26 is placed, the extended distance reserves extra space available for coating of the encapsulation layer 28. Therefore, the encapsulation layer 28 is not in contact with the outer electrode 26, or merely in contact with the sidewall of the outer electrode 26. Compared with the conventional packaging structure, the aforementioned extended distance may prevent the outer electrode from being coated with the encapsulation layer 28, or prevent the bottom of the outer electrode from being coated even with the excessive encapsulation layer 28. Besides, the extended distance may enhance the process tolerance, and therefore the over-current protection device can tolerate the excessive encapsulation layer in a certain range without decreasing the welding quality. Moreover, according to the present invention, the electrical resistance fluctuation can be significantly reduced when adopting the above design with the encapsulation layer on the insulation layer.

The above-described embodiments of the present invention are intended to be illustrative only. Numerous alternative embodiments may be devised by persons skilled in the art without departing from the scope of the following claims.

What is claimed is:

1. An over-current protection device, comprising:
   a resistor element having a first insulation layer, a first electrically conductive layer, a positive temperature coefficient (PTC) material layer, a second electrically conductive layer and a second insulation layer stacked sequentially from bottom to top, wherein the first insulation layer has a bottom surface and a first sidewall connected to the bottom surface, and the bottom surface has a first via and a second via penetrated therethrough;
   an outer electrode having a first electrode and a second electrode disposed on the bottom surface, wherein the first electrode and the second electrode are electrically connected to the first electrically conductive layer through the first via and the second via, respectively, and the first electrode is electrically isolated from the second electrode, wherein:
   the bottom surface of the first insulation layer has a long side and a short side, the first electrode is spaced apart from the short side by a first distance, and the first electrode is spaced apart from the long side by a second distance, wherein:
   the first distance and the second distance range from 2 mil to 9 mil;
   if the total length of the long side is calculated as 100%, the first distance ranges from 5% to 16% compared to the long side; and
   if the total length of the short side is calculated as 100%, the second distance ranges from 9% to 27% compared to the short side; and
   an encapsulation layer covering the first sidewall and extending to a part of the bottom surface of the first insulation layer, thereby forming a first perimeter on the bottom surface of the first insulation layer, wherein the first and second electrodes are located inside the first perimeter, and the encapsulation layer has a thickness ranging from 0.04 mm to 0.08 mm.

2. The over-current protection device of claim 1, wherein after stacking, an exposed portion of the first electrically conductive layer, an exposed portion of the PTC material layer, and an exposed portion of the second electrically conductive layer together form a peripheral sidewall, wherein the encapsulation layer covers the peripheral sidewall.

3. The over-current protection device of claim 2, wherein the second insulation layer has an upper surface opposite to the bottom surface and a second sidewall connected to the upper surface, wherein the encapsulation layer further covers the second sidewall and extends to a part of the upper surface, thereby forming a second perimeter on the upper surface of the second insulation layer, and the resistor element only exposes a center portion of the upper surface and a center portion of the bottom surface to external environment.

4. The over-current protection device of claim 3, wherein the encapsulation layer covers the part of the bottom surface of the first insulation layer and is not physically in contact with the first electrode and the second electrode.

5. The over-current protection device of claim 1, wherein the first electrode has a width extending along the long side, and a height extending away from the first insulation layer, wherein the width ranges from 0.1 mm to 0.5 mm, and the height ranges from 12 μm to 120 μm.

6. The over-current protection device of claim 5, wherein the encapsulation layer covers the part of the bottom surface of the first insulation layer and is physically in contact with a sidewall of the first electrode, wherein the first electrode has the height ranging from 50 μm to 120 μm.

7. The over-current protection device of claim 6, wherein the second electrode is spaced apart from a side of the bottom surface of the first insulation layer by a distance ranging from 2 mil to 9 mil.

8. The over-current protection device of claim 7, wherein the first electrode and the second electrode are spaced apart from each other by a third distance along the long side, and the third distance is larger than 0.23 mm.

9. The over-current protection device of claim 1, wherein the encapsulation layer comprises a material selected from the group consisting of epoxy resin, polyester resin, polyamide resin, phenolic resin, epoxy resin with glass fiber or inorganic filler, phenolic resin with glass fiber or inorganic filler, polyurethane resin, polycyanate resin, maleimide resin, polyolefin resin, polyphenylene oxide resin, silicone polymer, acrylic resin, photopolymer resin, inorganic glue, and combinations thereof.

10. An over-current protection device, comprising:
    a resistor element having a first insulation layer, a first electrically conductive layer, a positive temperature coefficient (PTC) material layer, a second electrically conductive layer, and a second insulation layer stacked sequentially from bottom to top, wherein the resistor element further has a left notch and a right notch at opposite left and right ends of the resistor element, wherein;

the first insulation layer has a bottom surface and a first sidewall connected to the bottom surface;

the second insulation layer has an upper surface and a second sidewall connected to the upper surface;

the left notch is disposed at the left end of the resistor element, and extends from the bottom surface to the upper surface; and the right notch is disposed at the right end of the resistor element, and extends from the bottom surface to the upper surface;

an outer electrode having a first electrode and a second electrode, wherein the first electrode is electrically connected to the second electrically conductive layer and disposed on the upper surface and the bottom surface at the right end, the second electrode is electrically connected to the first electrically conductive layer and disposed on the upper surface and the bottom surface at the left end, and the first electrode is electrically isolated from the second electrode; and an encapsulation layer covering the first sidewall and extending to a part of the bottom surface of the first insulation layer, thereby forming a perimeter discontinuously extending on the bottom surface of the first insulation layer, wherein the first and second electrodes are located inside a region encircled by the perimeter discontinuously extending on the bottom surface.

11. The over-current protection device of claim 10, wherein after stacking, an exposed portion of the first electrically conductive layer, an exposed portion of the PTC material layer, and an exposed portion of the second electrically conductive layer together form a peripheral sidewall, wherein the encapsulation layer covers the peripheral sidewall.

12. The over-current protection device of claim 11, wherein the encapsulation layer further covers the second sidewall and extends to a part of the upper surface, thereby forming a perimeter discontinuously extending on the upper surface of the second insulation layer, and the first and second electrodes are located inside a region encircled by the perimeter discontinuously extending on the upper surface, whereby the resistor element only and partially exposes the upper surface and the bottom surface to external environment.

13. The over-current protection device of claim 10, further comprises a left conductive member disposed in the left notch, and a right conductive member disposed in the right notch, wherein the first electrode is electrically connected to the second electrically conductive layer through the right conductive member and is electrically isolated from the first electrically conductive layer, and the second electrode is electrically connected to the first electrically conductive layer through the left conductive member and is electrically isolated from the second electrically conductive layer.

14. The over-current protection device of claim 13, wherein the bottom surface of the first insulation layer has two long sides and two short sides connected to the long sides, wherein the perimeter continuously extends along the long sides to the short sides, and then discontinuously extends along the short sides to the left conductive member and the right conductive member, respectively, whereby the left conductive member and the right conductive member are not fully covered by the encapsulation layer.

15. The over-current protection device of claim 10, wherein the first electrode is spaced apart from a side of the bottom surface of the first insulation layer by a distance ranging from 2 mil to 9 mil.

16. The over-current protection device of claim 10, wherein the encapsulation layer comprises a material selected from the group consisting of epoxy resin, polyester resin, polyamide resin, phenolic resin, epoxy resin with glass fiber or inorganic filler, phenolic resin with glass fiber or inorganic filler, polyurethane resin, polycyanate resin, maleimide resin, polyolefin resin, polyphenylene oxide resin, silicone polymer, acrylic resin, photopolymer resin, inorganic glue, and combinations thereof.

* * * * *